United States Patent
Elejalde et al.

(10) Patent No.: US 9,220,284 B2
(45) Date of Patent: *Dec. 29, 2015

(54) MULTILAYERED SUGAR FREE MANNITOL CONFECTIONERY AND METHODS OF MAKING SAME

(75) Inventors: Cesar C. Elejalde, Randolph, NJ (US); Bharat Jani, East Brunswick, NJ (US); Koichi Enomoto, Tokyo (JP); Deborah Levenson, Morristown, NJ (US); Joycelyn May, West Orange, NJ (US); Mary Robinson, Sparta, NJ (US); Kristen Schmitz, Jersey City, NJ (US); Aditi Shetty, Randolph, NJ (US); Simone A. O'Neill, Wayne, NJ (US); William John Hirt, New York, NY (US); Dorothy Euan, New York, NY (US)

(73) Assignees: INTERCONTINENTAL GREAT BRANDS LLC, East Hanover, NJ (US); MONDELEZ JAPAN LIMITED (JP)

( * ) Notice: Subject to any disclaimer, the term of this patent is extended or adjusted under 35 U.S.C. 154(b) by 694 days.

This patent is subject to a terminal disclaimer.

(21) Appl. No.: 12/990,546

(22) PCT Filed: May 1, 2009

(86) PCT No.: PCT/US2009/042524
§ 371 (c)(1),
(2), (4) Date: Mar. 11, 2011

(87) PCT Pub. No.: WO2009/135126
PCT Pub. Date: Nov. 5, 2009

(65) Prior Publication Data
US 2011/0159143 A1 Jun. 30, 2011

Related U.S. Application Data

(60) Provisional application No. 61/049,833, filed on May 2, 2008, provisional application No. 61/139,061, filed on Dec. 19, 2008, provisional application No. 61/161,114, filed on Mar. 18, 2009.

(51) Int. Cl.
*A23G 4/20* (2006.01)
*A23G 3/54* (2006.01)
(Continued)

(52) U.S. Cl.
CPC .. *A23G 3/54* (2013.01); *A23G 3/42* (2013.01); *A23G 4/10* (2013.01); *A23G 4/20* (2013.01); *A23V 2250/6418* (2013.01)

(58) Field of Classification Search
CPC ............. A23G 3/42; A23G 3/54; A23G 4/10; A23G 4/20
USPC ....................................... 426/3, 659
See application file for complete search history.

(56) References Cited

U.S. PATENT DOCUMENTS

| | | | |
|---|---|---|---|
| 146,541 | A | 1/1874 | Moore |
| 193,045 | A | 7/1877 | Sibley et al. |

(Continued)

FOREIGN PATENT DOCUMENTS

| | | | |
|---|---|---|---|
| EP | 0624318 | B1 | 12/1997 |
| EP | 0953295 | A1 | 11/1999 |

(Continued)

OTHER PUBLICATIONS

Mitchell, Helen, Ed. 2006. "Sweeteners and Sugar Alternatives in Food Technology." Chichester, GBR. Wiley. pp. 170-171.*

(Continued)

*Primary Examiner* — Nikki H Dees
(74) *Attorney, Agent, or Firm* — Cantor Colburn LLP

(57) ABSTRACT

Disclosed are sugar free confectionery products, methods of making, and multilayer structures prepared from the confectionery products and chewing gum.

33 Claims, 2 Drawing Sheets

(51) Int. Cl.
A23G 3/42 (2006.01)
A23G 4/10 (2006.01)

(56) References Cited

U.S. PATENT DOCUMENTS

| | | |
|---|---|---|
| 280,115 A | 6/1883 | Aubin |
| 1,242,562 A | 10/1917 | Laskey |
| 1,267,320 A | 5/1918 | Fries |
| 1,771,506 A | 7/1930 | Mustin |
| 1,771,981 A | 7/1930 | Mustin |
| 1,771,982 A | 7/1930 | Mustin |
| 1,855,145 A | 4/1932 | Jones |
| 2,215,575 A | 9/1940 | Bowman |
| 2,460,698 A | 2/1949 | Lindhe |
| 2,559,648 A | 7/1951 | Lindhe |
| 2,604,056 A | 7/1952 | Mahle |
| 2,973,273 A | 2/1961 | Curtiss |
| 3,062,662 A | 11/1962 | McDonald |
| 3,156,195 A | 11/1964 | Evanson et al. |
| 3,208,405 A | 9/1965 | Beer |
| 3,303,796 A | 2/1967 | Novissimo |
| 3,410,230 A | 11/1968 | Rossi |
| 3,477,394 A | 11/1969 | Tidwell |
| 3,492,131 A | 1/1970 | Schlatter |
| 3,857,965 A | 12/1974 | Ream |
| 3,912,817 A | 10/1975 | Sapsowitz |
| 4,032,661 A | 6/1977 | Rowsell et al. |
| 4,097,616 A | 6/1978 | Guillou et al. |
| 4,136,163 A | 1/1979 | Watson et al. |
| 4,150,161 A | 4/1979 | Rudolph et al. |
| 4,178,459 A | 12/1979 | Watson et al. |
| 4,224,345 A | 9/1980 | Tezuka et al. |
| 4,230,688 A | 10/1980 | Rowsell et al. |
| 4,238,510 A | 12/1980 | Cherukuri et al. |
| 4,254,149 A | 3/1981 | Rudolph et al. |
| 4,271,197 A | 6/1981 | Hopkins et al. |
| 4,271,199 A | 6/1981 | Cherukuri et al. |
| 4,279,931 A | 7/1981 | Verwaerde et al. |
| 4,296,255 A | 10/1981 | Roswell et al. |
| 4,346,116 A * | 8/1982 | Verwaerde et al. ............ 426/48 |
| 4,352,823 A | 10/1982 | Cherukuri et al. |
| 4,352,824 A | 10/1982 | Puglia et al. |
| 4,352,825 A | 10/1982 | Cherukuri et al. |
| D271,344 S | 11/1983 | Faust |
| D271,534 S | 11/1983 | Huzinec |
| D271,535 S | 11/1983 | Huzinec |
| 4,459,425 A | 7/1984 | Amano et al. |
| 4,491,596 A | 1/1985 | Elias |
| 4,496,592 A | 1/1985 | Kuwahara et al. |
| 4,601,907 A | 7/1986 | Knebl et al. |
| 4,614,654 A | 9/1986 | Ream et al. |
| 4,619,834 A | 10/1986 | Zanno et al. |
| 4,671,961 A | 6/1987 | Patel et al. |
| 4,707,363 A | 11/1987 | Sato et al. |
| 4,714,620 A | 12/1987 | Bunick et al. |
| 4,741,905 A | 5/1988 | Huzinec |
| 4,753,806 A | 6/1988 | Carroll et al. |
| 4,822,622 A | 4/1989 | Dokuzovic et al. |
| 4,847,090 A | 7/1989 | Della Posta et al. |
| 4,911,937 A | 3/1990 | Crosello et al. |
| 4,971,806 A | 11/1990 | Cherukuri et al. |
| 5,009,893 A | 4/1991 | Cherukuri et al. |
| 5,017,385 A | 5/1991 | Wienecke |
| 5,206,042 A | 4/1993 | Dave et al. |
| 5,266,592 A | 11/1993 | Grub et al. |
| 5,407,665 A | 4/1995 | McLaughlin et al. |
| 5,437,879 A | 8/1995 | Kabse et al. |
| 5,462,760 A | 10/1995 | Serpelloni et al. |
| 5,470,591 A | 11/1995 | Ribadeau-Dumas et al. |
| 5,538,741 A | 7/1996 | Richey et al. |
| 5,538,742 A | 7/1996 | McHale et al. |
| 5,545,424 A | 8/1996 | Nakatsu et al. |
| 5,580,601 A | 12/1996 | Ribadeau-Dumas et al. |
| 5,637,313 A | 6/1997 | Chau et al. |
| 5,679,397 A | 10/1997 | Kuroda et al. |
| 5,698,181 A | 12/1997 | Luo |
| 5,879,728 A | 3/1999 | Graff et al. |
| 5,900,261 A | 5/1999 | Ribadeau-Dumas et al. |
| 5,958,471 A | 9/1999 | Schwarz et al. |
| 6,056,988 A | 5/2000 | Bangerter et al. |
| 6,060,078 A | 5/2000 | Lee |
| 6,159,509 A | 12/2000 | Johnson et al. |
| 6,180,143 B1 | 1/2001 | Rapp et al. |
| 6,277,385 B1 | 8/2001 | Luke |
| 6,417,346 B1 | 7/2002 | Salome et al. |
| 6,592,884 B2 | 7/2003 | Hofmann et al. |
| 6,623,266 B2 | 9/2003 | Jani et al. |
| 6,627,233 B1 | 9/2003 | Wolf et al. |
| 6,780,443 B1 | 8/2004 | Nakatsu et al. |
| 6,805,890 B2 | 10/2004 | Wu et al. |
| 6,805,894 B1 | 10/2004 | Kimura et al. |
| 6,890,582 B2 | 5/2005 | Parady |
| 7,030,273 B1 | 4/2006 | Sun |
| 7,049,299 B2 | 5/2006 | Francois |
| 7,112,345 B1 | 9/2006 | McHale et al. |
| 7,189,760 B2 | 3/2007 | Erman et al. |
| 7,300,679 B1 | 11/2007 | Robinson et al. |
| 2003/0026826 A1 | 2/2003 | Cherukuri et al. |
| 2003/0134012 A1 | 7/2003 | Mederer |
| 2004/0156794 A1 | 8/2004 | Barkalow et al. |
| 2005/0220934 A1 | 10/2005 | Leadbeater et al. |
| 2005/0222256 A1 | 10/2005 | Erman et al. |
| 2005/0226990 A1 | 10/2005 | Pellecer et al. |
| 2005/0265930 A1 | 12/2005 | Erman et al. |
| 2006/0037910 A1 | 2/2006 | Shah et al. |
| 2006/0057276 A1 | 3/2006 | Carcasona et al. |
| 2006/0204451 A1 | 9/2006 | Salini |
| 2006/0280835 A1 * | 12/2006 | Jani et al. ............ 426/3 |
| 2007/0014889 A1 | 1/2007 | McHale et al. |
| 2007/0137502 A1 | 6/2007 | Fornaguera |
| 2007/0141198 A1 | 6/2007 | Yang |
| 2007/0148303 A1 | 6/2007 | Yeager et al. |
| 2007/0160707 A1 | 7/2007 | Garcia |
| 2007/0184149 A1 | 8/2007 | Barkalow et al. |
| 2007/0196534 A1 | 8/2007 | Barkalow et al. |
| 2007/0231426 A1 * | 10/2007 | Acar et al. ............ 426/5 |
| 2007/0246483 A1 | 10/2007 | Boudy et al. |
| 2008/0095899 A1 | 4/2008 | Fornaguera |
| 2008/0160138 A1 | 7/2008 | Boghani et al. |
| 2008/0166449 A1 | 7/2008 | Kabse et al. |
| 2008/0187621 A1 | 8/2008 | Boghani et al. |
| 2008/0199564 A1 | 8/2008 | Boghani et al. |
| 2009/0123502 A1 | 5/2009 | Kumiega et al. |
| 2009/0142443 A1 | 6/2009 | Robinson et al. |
| 2010/0136165 A1 | 6/2010 | Miladinov et al. |
| 2011/0159142 A1 | 6/2011 | Marin et al. |
| 2011/0189376 A1 | 8/2011 | Elejalde et al. |
| 2011/0262588 A1 | 10/2011 | Elejalde et al. |
| 2011/0262620 A1 | 10/2011 | Elejalde et al. |
| 2012/0207875 A1 | 8/2012 | Aldridge et al. |

FOREIGN PATENT DOCUMENTS

| | | |
|---|---|---|
| EP | 1554935 A1 | 7/2005 |
| GB | 2079129 A | 1/1982 |
| GB | 2115672 A | 9/1983 |
| GB | 2177587 A | 1/1987 |
| JP | 09075005 | 3/1997 |
| JP | 2007215450 | 8/2007 |
| JP | 2007289129 | 11/2007 |
| WO | 9726798 | 7/1997 |
| WO | 03032744 A1 | 4/2003 |
| WO | 2006026298 A3 | 3/2006 |
| WO | 2006063189 A3 | 6/2006 |
| WO | 2006125334 A1 | 11/2006 |
| WO | 2006127599 A2 | 11/2006 |
| WO | 2006127601 A3 | 11/2006 |
| WO | 2006127602 A3 | 11/2006 |
| WO | 2006127603 A3 | 11/2006 |
| WO | 2007051485 A1 | 5/2007 |
| WO | 2007070061 A1 | 6/2007 |
| WO | 2008016940 A1 | 2/2008 |

(56) References Cited

FOREIGN PATENT DOCUMENTS

| WO | 2008030274 | A1 | 3/2008 |
|----|------------|----|----|
| WO | 2008067207 | A1 | 6/2008 |
| WO | 2009154887 |    | 12/2009 |

OTHER PUBLICATIONS

Nabors, L.O., Ed. 2001. "Alternative Sweeteners." 3rd ed. New York: M. Dekker. pp. 1, 340.*
KR20090039105 A, Apr. 22, 2009, also published as KR100919653, Abstract, 13 pages.
JP2007215450 A, Abstract, Aug. 30, 2007, 1 page.
JP2796425 B2, Abstract, Sep. 10, 1998, 1 page.
DE3732677, Abstract, Apr. 6, 1989, 1 page.
JP4179445 A, Abstract, Jun. 26, 1996, 1 page.
JP5308905 A, Abstract, Nov. 22, 1993, 1 page.
BOOMER Super Bubble Gum—Apple, Report No. 315613, Publication Date Mar. 7, 2005.
BOOMER Super Bubble Gum—Jelly Watermelon, Report No. 270287, Publication Date Sep. 2, 2003.
BOOMER Fresh Gel Super Bubble Gum—Lemon Mint, Report No. 348893, Publication Date Jan. 23, 2006.
BOOMER Super Bubble Gum—Mango Jelly, Report No. 391793, Publication Date Oct. 7, 2006.
BOOMER Jelly Super Bubble Gum—Orange, Report No. 348891, Publication Date Jan. 23, 2006.
European Search Report, Application No. 10189107.5-1221 dated Mar. 8, 2011, 11 pages.
Fritz, "Using Confectionery Equipment to Manufacture Chewing Gum", The Manufacturing Confectioner, Nov. 2000, p. 45-48.
International Preliminary Report on Patentability and Written Opinion of the International Searching Authority. International Application No. PCT/US2009/042468. International Filing Date May 1, 2009, 8 pages.
International Preliminary Report on Patentability and Written Opinion of the International Searching Authority. International Application No. PCT/US2009/042524. International Filing Date May 1, 2009, 8 pages.
JOYCO Boomer Jelly Bubble Gum—Pineapple, Report No. 293583, Publication Date Jun. 21, 2004.
Kirk-Othmer Encyclopedia of Chemical Technology. 4th Ed. vol. 1, p. 492-494, 1991, John Wiley and Sons.
Raleigh, "HSH as a bulking agent in confections", Manufacturing Confectioner, Chicago IL, US, vol. 75, No. 11, p. 57-59, 1995.
Wrigley's Doublemint Chewing Gum—Gel, Report No. 335513, Publication Date Oct. 3, 2005.
JP2006158234A; Jun. 22, 2006; Abstract Only; 1 page.
Fritzsching, "Isomalt in Hard Candy Applications", The Manufacturing Confectioner, Nov. 1995, pp. 65-73, XP000862872.
JP2004534852A; Nov. 18, 2004; Abstract Only; 1 page.
JP2003512445A; Apr. 2, 2003; Abstract Only; 1 page.
Dodson, A.G., Pepper, T. 1985, "Confectionery Technology and the Pros and Cons of Using Non-sucrose Sweeteners." Food Chemistry. vol. 16. pp. 271-280.
JP Application No. 2011-507689; Feb. 4, 2014; English Translation of Office Action; 5 pages.
Kashi no Jiten [Dictionary on Confectionery], 2004, pp. 392-395 (section 2.2.2) with English Translation (8 pages).

* cited by examiner

MULTILAYERED SUGAR FREE MANNITOL CONFECTIONERY AND METHODS OF MAKING SAME

CROSS REFERENCE TO RELATED APPLICATIONS

This application is a U.S. National Stage of International Application No. PCT/US2009/042524 filed on May 1, 2009, which claims the benefit of U.S. Provisional Application Ser. No. 61/049,833 filed May 2, 2008; U.S. Provisional Application Ser. No. 61/139,061 filed Dec. 19, 2008; and U.S. Provisional Application Ser. No. 61/161,114 filed Mar. 18, 2009, each of which is hereby incorporated by reference in its entirety.

FIELD

This disclosure generally relates to a sugar-free confectionery, methods of making the sugar-free confectionery, and methods of using the sugar-free confectionery to prepare multilayered confectioneries, particularly with an additional confectionery comprising an elastomer.

BACKGROUND

Sugar-free comestibles are highly desired by consumers to meet certain dietary restrictions or for the distinct advantage of not contributing to tooth decay.

Multilayered comestible products provide unique properties to entice and engage the consumer, particularly when the comestible contains a different composition in each layer. However, preparation of multilayered comestibles with varying materials and which are solely prepared from sugar-free compositions pose unique challenges including processing considerations, stability considerations, and consumer acceptance.

There is a need, however, for new confectionary compositions, which provide the desired advantage of an initial burst of flavor in combination with a long lasting flavor profile.

There is also a need, however, for new confectionery and chewing gum compositions, which provide the desired advantage of new textural features such as matching or mismatched textures.

SUMMARY

In one embodiment, a multilayered confectionery comprises a candy layer comprising a mixture comprising a cooked base portion comprising mannitol and a hydrogenated starch hydrolysate syrup, and a fondant portion comprising mannitol, a hydrogenated starch hydrolysate syrup, and optionally further comprising a sorbitol syrup, wherein the candy layer comprises crystalline particles of mannitol; and a chewing gum layer comprising an elastomer; wherein a first surface of the candy layer is in contiguous contact with a surface of the chewing gum layer.

In another embodiment, a method of making a multilayered confectionery comprises preparing a candy layer comprising mixing a cooked base portion comprising mannitol and a hydrogenated starch hydrolysate syrup, and a fondant portion comprising mannitol, a hydrogenated starch hydrolysate syrup, and optionally further comprising a sorbitol syrup to form a candy comprising crystalline particles of mannitol; preparing a chewing gum layer comprising an elastomer; forming a multilayered confectionery wherein a first surface of the candy layer is in contiguous contact with a surface of the chewing gum layer; optionally preparing a second chewing gum layer comprising elastomer, wherein a surface of the second gum layer is in contiguous contact with a second surface of the candy layer.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1A:
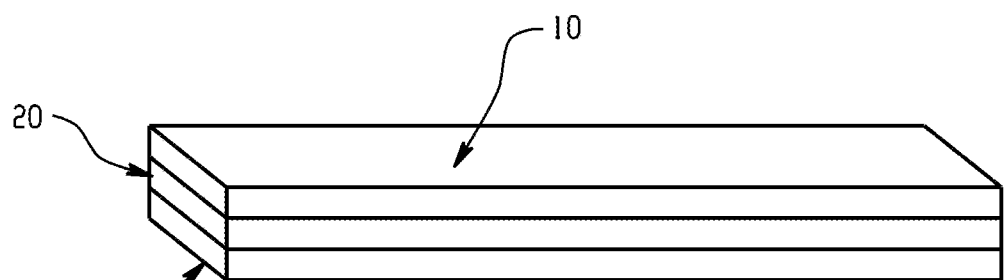
FIG. 1a is illustrative of an exemplary slab multilayered composition having chewing gum layers (10) and a center layer of confectionery composition (20) having a length (l), width (w), and height (h) where the center layer is visible from the surface defined by the length and height and the surface defined by the width and height, where l>w>h.

Disclosed herein are confectionery compositions, prepared from a sugar polyol base portion and a sugar polyol fondant portion, which provide sugar-free comestibles with unique textural properties. The textural properties of the confectionery composition can be conveniently tailored to provide for a desired consumer experience.

Also disclosed herein are comestible compositions that provide the advantages of both a sugar-free candy and a chewing gum, which can be sugar-based or sugar-free. As used herein, the term "sugar-free" refers to confectionery compositions that include carbohydrates other than sucrose but which do not necessarily exclude sucrose. Specifically, multilayered confectioneries are disclosed having a layer of sugar-free candy and a layer of chewing gum, and more specifically multiple layers of candy or chewing gum. By use of a chewing gum portion, the consumer is provided with a prolonged and lasting flavor profile while the confectionery composition portion provides a faster release of flavor for an initial burst of flavor or sweetness. The candy layer may include a sugar-free candy such as a chewy candy, a crunchy candy, a low boiled candy, a hard boiled, a fondant, a caramel, a jelly specifically a pectin jelly, a gummy, a nougat, a fruit leather, an edible film, a nut paste, chocolate, fudge, and a combination thereof. In several embodiments, the candy layer is prepared from the confectionery compositions containing fondant as disclosed herein.

The multilayered compositions provide visually distinct portions of the confectionery component and the chewing gum component thereby enhancing the consuming experience.

In the multilayered compositions, the textures of the confectionery component and the chewing gum can be controlled to match or mismatch thereby providing a new and unique consumer experience. For example, the confectionery component can be formulated to exhibit either a chewy or crunchy texture. The chewiness can be matched to the texture of the chewing gum.

To provide the match or mismatch of textures in the multilayered composition, the texture of the confectionery component may be selected from any point in a spectrum of hard to soft or crunchy to chewy. Furthermore, within the range of hardness, the confectionery composition may be more or less amorphous or more or less crystalline. For example, a hard-boiled candy is an amorphous confectionery that can provide a hard, crunchy texture. In contrast, a candy prepared from a low boiled sugar polyol syrup can provide a chewy confectionery that can be formulated to contain small amounts of localized crystalline polyol.

In one embodiment, the confectionery composition can be prepared to be chewy in texture while at the same time containing a degree of crystallization (also sometimes referred to as an amount of graining) so that it has a short texture. This short texture can be characterized as one where an amount of the confection breaks relatively quickly when pulled resulting in a two pieces that have short lengths. By contrast, a longer texture confectionery composition has less graining and is characterized by a stretchy matrix that becomes long when pulled due to the stretchiness. The graining allows for a soft initial bite to match the soft bite experienced with the chewing gum layer. Graining can be effected by allowing a crystallizable polyol in the confectionery composition to crystallize or by incorporating crystalline polyol material into the confectionery composition. In some embodiments, the tendency of the polyol to crystallize is exploited by seeding the polyol containing portion so that it will crystallize over time to adjust the texture from a harder texture during manufacture to a softer texture at the time of consumption. In another embodiment, the graining is carried out using mechanical agitation during the process of preparing the confectionery composition, for example by controlling the mechanical mixing speeds and/or shear during processing, controlling mixing times, or controlling the tempering process. In another embodiment, crystallization and thus texture can be controlled by incorporating a non-crystallizing carbohydrate. This non-crystallizing carbohydrate hinders crystal formation of the crystallizable polyol. Exemplary non-crystallizing carbohydrates can include hydrogenated starch hydrolysate syrups, maltitol syrups, mannitol syrups, sorbitol syrups, corn syrups, and combinations thereof. In some embodiments, the non-crystallizing carbohydrate can be referred to as a "doctor" meaning that it is used to control or adjust the crystallinity of the crystallizable polyol.

Overview

In some embodiments, the confectionery composition comprises a mixture comprising a cooked base portion comprising at least two sugar polyols, and a fondant portion comprising a crystalline sugar polyol and an amorphous sugar polyol.

In some embodiments, the confectionery composition comprises a mixture comprising a cooked base portion comprising mannitol and a hydrogenated starch hydrolysate syrup, and a fondant portion comprising mannitol and a hydrogenated starch hydrolysate syrup.

In some embodiments, the confectionery composition comprises a mixture comprising a cooked base portion comprising isomalt and a hydrogenated starch hydrolysate syrup, and a fondant portion comprising isomalt and a hydrogenated starch hydrolysate syrup.

In some embodiments, the sugar polyol is selected from the group consisting of erythritol, galactitol, hydrogenated isomaltulose (isomalt), a hydrogenated starch hydrolysate, lactitol, maltitol, polyglycitol, sorbitol, xylitol, a sorbitol syrup, and a combination thereof.

In some embodiments, the base or fondant portion comprises a crystalline polyol and an amorphous polyol.

In some embodiments, the crystalline polyol of the base portion is the same as the crystalline polyol of the fondant portion.

In some embodiments, the amorphous polyol is selected from the group consisting of erythritol syrup, a hydrogenated starch hydrolysate syrup, isomalt syrup, lactitol syrup, maltitol syrup, mannitol syrup, sorbitol syrup, xylitol syrup, and a combination thereof.

In some embodiments, the total amount of sugar polyol present in the confectionery composition is about 70 to about 90% w/w of the confectionery composition. In some embodiments, the total amount of sugar polyol present in the confectionery composition is about 75 to about 85% w/w of the confectionery composition.

In some embodiments, the confectionery composition comprises about 6 to about 22% w/w mannitol based on the total weight of a pulled confectionery composition. In some embodiments, the confectionery composition comprises is about 6 to about 30% w/w mannitol based on the total weight of a confectionery composition worked by high energy mixing.

In some embodiments, the fondant further comprises a sorbitol syrup.

In some embodiments, the hydrogenated starch hydrolysate syrup contains about 75 to about 85% solids, about 4% w/w sorbitol, about 53% w/w maltitol, about 22% w/w polyols having a degree of polymerization of 3-5, and about 21% w/w polyols having degree of polymerization of 6 and greater.

In some embodiments, the hydrogenated starch hydrolysate syrup comprises maltitol and sorbitol in a ratio of about 1:0.8 to about 1:1.2 maltitol to sorbitol. In other embodiments, the hydrogenated starch hydrolysate syrup comprises maltitol and sorbitol in a ratio of about 1:0.9 to about 1:1.1 maltitol to sorbitol.

In some embodiments, the confectionery composition comprises mannitol in an amount of about 35 to about 60% w/w (dry) of the fondant, and hydrogenated starch hydrolysate syrup present in an amount of about 40 to about 65% w/w (dry) of the fondant.

In some embodiments, the confectionery composition comprises mannitol present in an amount of about 45 to about 55% w/w (dry) of the fondant, and hydrogenated starch hydrolysate syrup present in an amount of about 45 to about 55% w/w (dry) of the fondant.

In some embodiments, the confectionery composition comprises mannitol present in an amount of about 35 to about 60% w/w (dry) of the fondant, hydrogenated starch hydrolysate syrup present in an amount of about 20 to about 33% w/w (dry) of the fondant; and sorbitol syrup present in an amount of about 20 to about 33% w/w (dry) of the fondant.

In some embodiments, the confectionery composition comprises mannitol present in an amount of about 45 to about 55% w/w (dry) of the fondant, hydrogenated starch hydrolysate syrup present in an amount of about 22 to about 27% w/w (dry) of the fondant; and sorbitol syrup present in an amount of about 22 to about 27% w/w (dry) of the fondant.

In some embodiments, the confectionery composition comprises mannitol present in an amount of about 35 to about 60% w/w (dry) of the fondant, hydrogenated starch hydrolysate syrup present in an amount of about 40 to about 65% w/w (dry) of the fondant, wherein the hydrogenated starch hydrolysate syrup comprises maltitol and sorbitol in a ratio of about 1:0.9 to about 1:1.1 maltitol to sorbitol.

In some embodiments, the fondant is present in an amount of about 2.0 to about 15.0% w/w of the confectionery composition. In some embodiments, the fondant is present in an amount of about 4.0 to about 12.0% w/w of the confectionery composition. In some embodiments, the fondant is present in an amount of about 5.0 to about 10.0% w/w of the confectionery composition. In some embodiments, the fondant is present in an amount of about 6.0 to about 7.5% w/w of the confectionery composition.

In some embodiments, the fondant comprises crystalline particles of sugar polyol having an average particle size of less than 50 micrometers.

In some embodiments, the fondant comprises crystalline particles of mannitol having crystals of an average length of ≤30 micrometers as determined by microscopic analysis.

In some embodiments, the fondant comprises crystalline particles of mannitol having crystals of an average length of about 1 to about 25 micrometers as determined by microscopic analysis.

In some embodiments, the base portion comprises about 30 to about 50% w/w isomalt and about 50 to about 70% w/w hydrogenated starch hydrolysate syrup of the base portion (dry weight).

In some embodiments, the fondant portion comprises about 65 to about 80% w/w isomalt and about 20 to about 35% w/w hydrogenated starch hydrolysate syrup of the fondant portion (dry weight).

In some embodiments, the ratio of isomalt to hydrogenated starch hydrolysate syrup is about 30:70 to about 50:50 based on the confectionery composition. In some embodiments, the ratio of isomalt to hydrogenated starch hydrolysate syrup is about 35:65 to about 45:55 based on the confectionery composition. In some embodiments, the ratio of isomalt to hydrogenated starch hydrolysate syrup is about 40:60 based on the confectionery composition. In some embodiments, the ratio of isomalt to hydrogenated starch hydrolysate syrup is about 75:25 to about 55:45 based on the confectionery composition. In some embodiments, the ratio of isomalt to hydrogenated starch hydrolysate syrup is about 70:30 to about 60:40 based on the confectionery composition. In some embodiments, the ratio of isomalt to hydrogenated starch hydrolysate syrup is about 65:35 based on the confectionery composition.

In some embodiments, the base portion comprises isomalt, and wherein the isomalt comprises greater than 50% w/w of 1,6-GPS based on the total weight of the isomalt. In some embodiments, the base portion comprises isomalt, and wherein the isomalt of the base portion comprises about 75 to about 80% w/w of 1,6-GPS based on the total weight of the isomalt.

In some embodiments, the fondant comprises isomalt, and wherein the isomalt of the fondant portion comprises a ratio of about 1:1 1,6-GPS to 1,1-GPM.

In some embodiments, the fondant comprises a moisture content of about 6.5 to about 11.0% w/w of the fondant prior to its incorporation with the base portion. In some embodiments, the fondant comprises a moisture content of about 8.0 to about 9.5% w/w of the fondant prior to its incorporation with the base portion. In some embodiments, the fondant comprises a moisture content of about 8.5 to about 9.0% w/w of the fondant prior to its incorporation with the base portion.

In some embodiments, the fondant further comprises a flavor, a flavor modulator, a flavor potentiator, a sensate, a food acid or salt thereof, or a combination thereof in an amount of about 1.0 to about 11.25% w/w of the total weight of the fondant.

In some embodiments, the fondant further comprises an emulsifier in an amount of about 0.02 to about 0.5% w/w of the total weight of the fondant. In some embodiments, the emulsifier is lecithin.

In some embodiments, the confectionery composition has a moisture content of no more than about 10% w/w. In some embodiments, the confectionery composition has a moisture content of about 6.0 to about 8.0% w/w. In some embodiments, the confectionery composition has a moisture content of about 6.3 to about 7.5% w/w. In some embodiments, the confectionery composition has a moisture content of about 6.5 to about 7.0% w/w.

In some embodiments, the confectionery composition further comprises a texturizing agent selected from the group consisting of a gelatin, a hydrocolloid, albumin, a natural gum, a modified starch, a cellulose, polydextrose, a nanoclay, and a combination thereof. In some embodiments, the texturizing agent is a gelatin.

In some embodiments, the texturizing agent is present in an amount of about 0.5 to about 3.0% w/w of the confectionery composition. In some embodiments, the texturizing agent is present in an amount of about 1.0 to about 2.5% w/w of the confectionery composition. In some embodiments, the texturizing agent is present in an amount of about 1.5 to about 2.0% w/w of the confectionery composition.

In some embodiments, the texturizing agent is gelatin having a Bloom of greater than or equal to about 125. In some embodiments, the texturizing agent is gelatin having a Bloom of greater than or equal to about 200.

In some embodiments, the confectionery composition further comprises an oil or fat. In some embodiments, the oil or fat is selected from the group consisting of partially or fully hydrogenated vegetable oil, partially or fully hydrogenated animal fat, a glyceride, and a combination thereof. In some embodiments, the partially or fully hydrogenated oil or fat is selected from the group consisting of coconut oil, corn oil, palm kernel oil, peanut oil, soy bean oil, sesame oil, cottonseed oil, cocoa butter, milk fat, beef tallow, and lard. In some embodiments, the oil or fat is partially or fully hydrogenated coconut oil. In some embodiments, the oil or fat has an iodine value of 10 or less. In some embodiments, the oil or fat has an iodine value of about 45 to about 55. In some embodiments, the oil or fat has a melting point of about 35 to about 40° C.

In some embodiments, the fat is present in an amount of about 2.0 to about 6.0% w/w of the confectionery composition. In some embodiments, the fat is present in an amount of about 3.0 to about 5.0% w/w of the confectionery composition.

In some embodiments, the confectionery composition further comprises an emulsifier. In some embodiments, the emulsifier is selected from the group consisting glyceryl monostearate, lecithin, a fatty acid monoglyceride, a diglyceride, propylene glycol monostearate, and a combination thereof. In some embodiments, the emulsifier is selected from the group consisting glyceryl monostearate, lecithin, and a combination thereof.

In some embodiments, the ratio of lecithin to glyceryl monostearate is about 1:5 to about 1:7.

In some embodiments, the emulsifier is present in an amount of about 0.1 to about 1.0% w/w of the confectionery composition. In some embodiments, the confectionery composition comprising lecithin in an amount of about 0.001 to about 0.1% w/w of the confectionery composition; and glyceryl monostearate in an amount of about 0.01 to about 0.7% w/w of the confectionery composition.

In some embodiments, the confectionery composition comprises an emulsifier and a texturizing agent, wherein the ratio of the total amount of emulsifier to the total amount of texturizing agent is about 1:6 to about 1:9.

In some embodiments, the confectionery composition further comprises a food acid or salt thereof. In some embodiments, the food acid or salt thereof is selected from the group consisting of acetic acid, adipic acid, ascorbic acid, butyric acid, citric acid, formic acid, fumaric acid, glyconic acid, lactic acid, phosphoric acid, malic acid, oxalic acid, sodium citrate dihydrate, succinic acid, tartaric acid, and a combination thereof. In some embodiments, the food acid or salt thereof is selected from the group consisting citric acid, malic acid, sodium citrate dihydrate, and a combination thereof.

In some embodiments, the food acid or salt is citric acid and malic acid in a ratio of about 2:1 to about 1:1 citric to malic acid.

In some embodiments, the food acid or salt thereof is present in the confectionery composition in an amount of about 0.5 to about 4.0% w/w of the confectionery composition.

In some embodiments, the confectionery composition further comprises an ingredient selected from the group consisting of an additional sweetener, a sensate, a flavor, a color, a functional ingredient, a gas, an abrasive, particles of a second confectionery, and a combination thereof. In some embodiments, at least a portion of the ingredient is at least partially encapsulated.

In some embodiments, the confectionery composition comprises a flavor in an amount of about 0.75 to about 3.0% w/w of the confectionery composition.

In some embodiments, the confectionery composition comprises a mixture of a flavor and a food acid or salt thereof. In some embodiments, the ratio of flavor to food acid is about 1:1.

In some embodiments, the confectionery composition comprises 0 to less than 10% w/w of the confectionery composition of a spray-dried flavor.

In some embodiments, the additional sweetener is a high intensity sweetener.

In some embodiments, the sensate is selected from the group consisting of a cooling agent, a warming agent, a tingling agent, and a combination thereof.

In some embodiments, the functional ingredient is selected from the group consisting of a breath freshener, a dental care component, an active, an herbal, an effervescing system, an appetite suppressor, a vitamin, a micronutrient, a mouth moistening component, a throat care component, an energy boosting agent, a concentration boosting agent, and a combination thereof.

In some embodiments, the color is selected from the group consisting of a glitter, a pearlescent pigment, and a combination thereof.

In some embodiments, the abrasive is selected from the group consisting of isomalt particles, silica, and a combination thereof.

In some embodiments, the particle of a second confectionery is selected from the group consisting of a chewy candy, a crunchy candy, a low boiled candy, a hard boiled, a fondant, a caramel, a jelly, a gummy, a nougat, a fruit leather, a nut paste, chocolate, fudge, and a combination thereof.

In some embodiments, the confectionery composition further comprises an incorporated gas selected from the group consisting of carbon dioxide, nitrous oxide, oxygen, nitrogen, and a combination thereof, wherein the incorporated gas is present in an amount of about 0.5 to about 15 ml per gram of the confectionery composition.

In some embodiments, a sample piece of the confectionery composition measuring 35 mm long ×5.5 mm thickness ×12.5 mm width exhibits a maximum force of about 3000 to about 4000 grams when a texture analyzer probe penetrates the sample parallel to its thickness and perpendicular to the face measuring 35 mm Long ×12.5 mm wide by 3 millimeters; wherein the sample is conditioned at 25° C. four hours prior to analysis, the texture analyzer plunger is 4 mm cylinder; the approach speed is 1 mm/sec; and the penetration distance is 4.3 mm.

In some embodiments, the confectionery composition exhibits a water activity of about 0.38 to about 0.45.

In some embodiments, the confectionery composition exhibits a density of about 1.1 to about 1.4 g/cm$^3$.

In some embodiments, the confectionery composition comprises a cooked base portion comprising mannitol in an amount of about 8.0 to about 12.0% w/w of the composition and hydrogenated starch hydrolysate syrup in an amount of about 70.0 to about 74.0% w/w of the composition; a fondant portion comprising mannitol in an amount of about 4.0 to about 6.0% w/w of the composition; hydrogenated starch hydrolysate syrup in an amount of about 1.0 to about 3.0% w/w of the composition; and sorbitol syrup in an amount of about 1.0 to about 3.0% w/w of the composition; wherein the fondant comprises crystalline particles of mannitol; a texturizing agent in an amount of about 1.0 to about 2.0% w/w of the composition; a fat having a melting point of about 35 to about 40° C. in an amount of about 3.0 to about 4.0% w/w of the composition; lecithin in an amount of about 0.001 to about 0.1% w/w of the composition; and glyceryl monostearate in an amount of about 0.01 to about 0.7% w/w of the composition; wherein the composition has a moisture content of about 6.5 to about 7.0% w/w of the composition.

In some embodiments, the confectionery composition comprises a base portion comprising mannitol in an amount of about 5.0 to about 20.0% w/w of the composition, wherein a portion of the mannitol comprises crystalline particles having crystals of an average length of about 1 to about 25 micrometers as determined by microscopic analysis, and hydrogenated starch hydrolysate syrup in an amount of about 70.0 to about 85.0% w/w of the composition; a texturizing agent in an amount of about 1.0 to about 2.0% w/w of the composition; a fat having a melting point of about 35 to about 40° C. in an amount of about 3.0 to about 4.0% w/w of the composition; lecithin in an amount of about 0.001 to about 0.1% w/w of the composition; and glyceryl monostearate in an amount of about 0.01 to about 0.7% w/w of the composition, wherein the composition has a moisture content of about 6.5 to about 7.0% w/w.

In some embodiments, the confectionery composition comprises a base portion comprising isomalt and hydrogenated starch hydrolysate syrup, wherein the isomalt present in the base portion comprises about 75 to about 80% w/w of 1,6-GPS based on the total weight of isomalt, and wherein the base portion comprises about 35 to about 45% w/w isomalt and about 55 to about 65% w/w hydrogenated starch hydrolysate syrup of the base portion (dry weight); a fondant portion comprising isomalt and hydrogenated starch hydrolysate syrup, wherein the isomalt of the fondant portion comprises a ratio of about 1:1 1,6-GPS to 1,1-GPM, wherein the fondant portion comprises about 65 to about 80% w/w isomalt and about 20 to about 35% w/w hydrogenated starch hydrolysate syrup of the fondant portion (dry weight), and wherein the fondant comprises crystalline particles of isomalt; and wherein the confectionery composition further comprises a texturizing agent; a fat; and an emulsifier.

In some embodiments, a method of preparing a confectionery composition comprises cooking a base portion comprising at least two sugar polyols to obtain a cooked base portion; adding to the cooked base portion a texturizing agent and optionally an ingredient selected from the group consisting of a fat/oil, a food acid or salt thereof, a flavor, and a combination thereof to form a mixture; cooling the mixture to form a cooled mixture; adding a fondant portion to the cooled mixture to form a final mixture, wherein the fondant portion comprises a sugar polyol; and pulling the final mixture to form a confectionery composition.

In some embodiments, a method of preparing a confectionery composition comprises cooking a base portion comprising mannitol and a hydrogenated starch hydrolysate syrup to obtain a cooked base portion; adding to the cooked base portion a texturizing agent and optionally an ingredient selected from the group consisting of a fat/oil, a food acid or salt thereof, a flavor, and a combination thereof to form a mixture; cooling the mixture to form a cooled mixture; adding a fondant portion to the cooled mixture to form a final mixture, wherein the fondant portion comprises mannitol and a hydrogenated starch hydrolysate syrup, and optionally sorbitol syrup; and pulling the final mixture to form a confectionery composition.

In some embodiments, a target cook temperature is about 128 to about 136° C. In some embodiments, a target cook temperature is about 130 to about 134° C.

In some embodiments, the final mixture is pulled for about 6 to about 10 minutes.

In some embodiments, the confectionery composition is prepared using a batch method or a continuous method.

In some embodiments, a multilayered confectionery comprises a candy layer comprising the confectionery compositions previously described and a chewing gum layer comprising an elastomer, wherein a first surface of the candy layer is in contiguous contact with a surface of the gum layer.

In some embodiments, a multilayered confectionery comprises a sugar-free candy layer comprising a sugar-free candy selected from the group consisting of a chewy candy, a crunchy candy, a low boiled candy, a hard boiled, a fondant, a caramel, a jelly, a gummy, a fruit leather, an edible film, a nut paste, chocolate, fudge, and a combination thereof; and a chewing gum layer comprising an elastomer, wherein a first surface of the candy layer is in contiguous contact with a surface of the gum layer.

In some embodiments, the chewing gum comprises a gum base wherein the gum base includes the elastomer; a fat; an emulsifier; and optionally an additional gum base ingredient selected from the group consisting of a wax, a filler, an antioxidant, and a combination thereof.

In some embodiments, the chewing gum comprises a gum base in an amount of about 25 to about 50% w/w of the chewing gum. In some embodiments, the chewing gum comprises a gum base in an amount of about 30 to about 45% w/w of the chewing gum.

In some embodiments, the elastomer is present in an amount of about 0.2% w/w to about 15% w/w by weight of the chewing gum. In some embodiments, the elastomer is present in an amount of about 3.0% w/w to about 8% w/w by weight of the chewing gum.

In some embodiments, the chewing gum comprises about 5 to about 15% w/w isobutyleneisoprene copolymer based on the weight of the gum base.

In some embodiments, the chewing gum further comprises a bulk sweetener, a softener system, a food acid or salt thereof, and a combination thereof.

In some embodiments, the bulk sweetener of the chewing gum is a sugar polyol selected from the group consisting of erythritol, galactitol, hydrogenated isomaltulose (isomalt), a hydrogenated starch hydrolysate, lactitol, maltitol, mannitol, polyglycitol, sorbitol, xylitol, and a combination thereof.

In some embodiments, the bulk sweetener of the chewing gum is selected from the group consisting of erythritol, xylitol, and a combination thereof in an amount of about 10 to about 60% w/w based on the weight of the chewing gum.

In some embodiments, the bulk sweetener of the chewing gum is a sugar polyol selected from the group consisting of maltitol, sorbitol, and a combination thereof.

In some embodiments, the bulk sweetener of the chewing gum comprises a ratio of about 1:3 to about 1:5 sorbitol to maltitol.

In some embodiments, the bulk sweetener of the chewing gum is present in an amount of about 40 to about 60% w/w of the chewing gum. In some embodiments, the bulk sweetener is present in an amount of about 45 to about 55% w/w of the chewing gum.

In some embodiments, the softener is an ingredient selected from the group consisting of lanolin, palmitic acid, oleic acid, stearic acid, sodium stearate, potassium stearate, glyceryl triacetate, lecithin, glyceryl lecithin, glyceryl monostearate, propylene glycol monostearate, an acetylated monoglyceride, glycerine, a natural or synthetic wax, a hydrogenated vegetable oil, sorbitan monostearate, tallow, propylene glycol, a hydrogenated starch hydrolysate, and a combination thereof.

In some embodiments, the softener is an ingredient selected from the group consisting of an acetylated monoglyceride, lecithin, glycerine, a hydrogenated starch hydrolysate, and a combination thereof.

In some embodiments, the softener is present in an amount of about 1 to about 5% w/w of the chewing gum. In some embodiments, the softener is present in an amount of about 1.5 to about 4% w/w of the chewing gum.

In some embodiments, the food acid selected from the group consisting of acetic acid, adipic acid, ascorbic acid, butyric acid, citric acid, formic acid, fumaric acid, gluconic acid, lactic acid, phosphoric acid, malic acid, oxalic acid, succinic acid, tartaric acid, and a combination thereof. In some embodiments, the food acid selected from the group consisting of citric acid, malic acid, and a combination thereof.

In some embodiments, the food acid is present in an amount of about 0.1 to about 1.5% w/w of the chewing gum. In some embodiments, the food acid is present in an amount of about 0.3 to about 1.0% w/w of the chewing gum.

In some embodiments, the chewing gum further comprises an ingredient selected from the group consisting of a high intensity sweetener, a sensate, a flavor, a color, a functional ingredient, an antioxidant, particles of boiled candy, and a combination thereof. In some embodiments, at least a portion of the ingredient is at least partially encapsulated.

In some embodiments, the high intensity sweetener is selected from the group consisting of aspartame, neotame, sucralose, monatin, acesulfame potassium, an encapsulated form of the high intensity sweetener, and a combination thereof. In some embodiments, the high intensity sweetener is selected from the group consisting of aspartame, acesulfame potassium, an encapsulated form of the high intensity sweetener, and a combination thereof.

In some embodiments, the high intensity sweetener is present in an amount of about 2 to about 6% w/w of the chewing gum. In some embodiments, the high intensity sweetener is present in an amount of about 3 to about 5% w/w of the chewing gum.

In some embodiments, the sensate is selected from the group consisting of a cooling agent, a warming agent, a tingling agent, and a combination thereof.

In some embodiments, the flavor, sensate, and a combination thereof is present from 0 to 5.0% w/w of the chewing gum.

In some embodiments, the functional ingredient is selected from the group consisting of a breath freshener, a dental care component, an active, an herbal, an effervescing system, an appetite suppressor, a vitamin, a micronutrient, a mouth moistening component, a throat care component, an energy boosting agent, a concentration boosting agent, and a combination thereof.

In some embodiments, the color is selected from the group consisting of a glitter, a pearlescent pigment, and a combination thereof.

In some embodiments, the chewing gum comprises about 0.1 to about 0.5% w/w cooling agent by weight of the chewing gum; and the candy comprises about 1.0 to about 3.75% w/w food acid by weight of the candy.

In some embodiments, the chewing gum comprises about 1.5 to about 2.2% w/w flavor by weight of the chewing gum; and the candy layer comprises about 1.5 to about 3.0% w/w flavor by weight of the candy.

In some embodiments, the chewing gum comprises about 1.5 to about 2.2% w/w flavor by weight of the chewing gum, and about 0.1 to about 0.5% w/w cooling agent by weight of the chewing gum; and the candy comprises about 1.5 to about 3.0% w/w flavor by weight of the candy, and about 1.0 to about 3.75% w/w food acid by weight of the candy.

In some embodiments, the water activity of the candy layer is within about 10% of the water activity of the chewing gum layer. In some embodiments, the water activity of the candy layer is within about 5% of the water activity of the chewing gum layer. In some embodiments, the water activity of the candy layer is substantially the same as the water activity of the chewing gum layer.

In some embodiments, the texture of the candy layer is substantially the same as the texture of the chewing gum layer.

In some embodiments, a multilayered confectionery comprises a candy layer comprising the confectionery compositions previously described and a first chewing gum layer and a second chewing gum layer each comprising an elastomer, wherein a first surface of the candy layer is in contiguous contact with a surface of the first gum layer and wherein a surface of the second gum layer is in contiguous contact with a second surface of the candy layer.

In some embodiments, the layers are in a laminate configuration such that a center layer is visible on all but two faces of the confectionery composition.

In some embodiments, the multilayered confectionery comprises alternating layers of candy layers and chewing gum layers.

In some embodiments, one layer of confectionery composition is encased between two layers of chewing gum.

In some embodiments, one layer of chewing gum is encased between two layers of confectionery composition.

In some embodiments, two layers of confectionery composition are encased between three layers of chewing gum in an alternating fashion where a centermost layer and outside layers are chewing gum.

In some embodiments, two layers of chewing gum are encased between three layers of confectionery composition in an alternating fashion where a centermost layer and outside layers are confectionery composition.

In some embodiments, the multilayered confectionery comprises alternating layers of chewing gum and confectionery composition where the outside layers can be chewing gum, confectionery composition, or one of each; the total number of layers can be 3, 4, 5, 6, 7, 8, 9, 10, 11, 12, or more.

In some embodiments, the multilayered confectionery has a length (l), width (w), and height (h) where a center layer is only visible from the surface defined by the length and width and the surface defined by the width and height, where l>w≥h or l≥w>h.

In some embodiments, the multilayered confectionery has a length (l), width (w), and height (h) where a center layer is only visible from the surface defined by the length and height and the surface defined by the width and height, where l>w≥h or l≥w>h.

In some embodiments, the multilayered confectionery has a length (l), width (w), and height (h) where a center layer is only visible from the surface defined by the length and height and the surface defined by the length and width, where l>w≥h or l≥w>h.

In some embodiments, the multilayered confectionery is a centerfill having a shell of chewing gum and a centerfill of confectionery composition.

In some embodiments, the multilayered confectionery is a centerfill having a shell of confectionery composition and a centerfill of chewing gum.

In some embodiments, the multilayered confectionery comprises a plurality of layers of overlapping centerfill compositions compacted to a laminated format.

In some embodiments, the multilayered confectionery comprises ropes of the multilayered confectionery which have been twisted and compacted to produce a multipatterned product having a length (l), width (w), and height (h).

In some embodiments, the multilayered confectionery comprises two or more ropes of the multilayered confectionery compacted together or embedded one within another to produce a multipatterned product having a length (l), width (w), and height (h).

In some embodiments, the layers are in a jelly roll configuration where all of the layers are visible from a cross section of the confectionery.

In some embodiments, the layers are in discrete concentric layers where all of the layers are visible from a cross section of the confectionery.

In some embodiments, the concentric layers have a shape selected from the group consisting of circular, square, rectangle, triangle, pentagon, hexagon, heptagon, octagon, star, and animal.

In some embodiments, the multilayered confectionery comprises about 20 to about 40% w/w of the candy layer and about 60 to about 80% w/w of the chewing gum layer based on the combined weight of candy layer and chewing gum layer.

In some embodiments, the multilayered confectionery comprises about 25 to about 35% w/w of the candy layer and about 65 to about 75% w/w of the chewing gum layer based on the combined weight of candy layer and chewing gum layer.

In some embodiments, the chewing gum layer is split into a first portion and a second portion and wherein the confectionery comprises about 25% w/w to about 35% w/w of the candy layer and about 25% w/w to about 35% w/w of the first portion of the chewing gum layer and about 25% w/w to about 35% w/w of the second portion of the chewing gum layer.

In some embodiments, the candy layer is split into a first portion and a second portion and wherein the confectionery comprises about 25% w/w to about 35% w/w of the chewing gum layer and about 25% w/w to about 35% w/w of the first portion of the candy layer and about 25% w/w to about 35% w/w of the second portion of the candy layer.

In some embodiments, the multilayered confectionery is in the form of a discrete slab, pellet, cube, chunk, stick, square, rectangle, ball or coin shape.

In some embodiments, the multilayered confectionery is free of dusting media.

In some embodiments, the multilayered confectionery is maintained at a temperature above the glass transition temperature of the candy layer.

In some embodiments, the multilayered confectionery further comprises a pan coating, a particulate coating (e.g., sanding, dusting, etc.), or an oil coating.

In some embodiments, the multilayered confectionery further comprises a hard coating, a soft coating, a sanded coating, or a dust coat.

In some embodiments, the multilayered confectionery further comprises a barrier layer is provided between adjacent layers to reduce or prevent migration of an ingredient between the layers.

In some embodiments, the barrier layer is selected from the group consisting of a lipid-based coating, shellac, zein, a cellulose-based coating, and a combination thereof.

In some embodiments, a multilayered confectionery comprises a candy layer comprising a confectionery composition; and a first chewing gum layer and a second chewing gum layer, wherein the candy layer is disposed between the first and second gum layers in a laminate configuration such that each layer is visible on at least two faces of the confectionery composition; wherein the confectionery composition comprises a base portion comprising isomalt and hydrogenated starch hydrolysate syrup, wherein the isomalt present in the base portion comprises about 75 to about 80% w/w of 1,6-GPS based on the total weight of isomalt, and wherein the base portion comprises about 35 to about 45% w/w isomalt and about 55 to about 65% w/w hydrogenated starch hydrolysate syrup of the base portion (dry weight); a fondant portion comprising isomalt and hydrogenated starch hydrolysate syrup, wherein the isomalt of the fondant portion comprises a ratio of about 1:1 1,6-GPS to 1,1-GPM, wherein the fondant portion comprises about 65 to about 80% w/w isomalt and about 20 to about 35% w/w hydrogenated starch hydrolysate syrup of the fondant portion (dry weight), and wherein the confectionery composition comprises crystalline particles of isomalt; a texturizing agent; a fat; and an emulsifier; and wherein the first and second chewing gum layers include an elastomer.

In some embodiments, the multilayered confectionery comprises a candy layer comprising a confectionery composition; and a first chewing gum layer and a second chewing gum layer, wherein the candy layer is disposed between the first and second gum layers in a laminate configuration such that each layer is visible on at least two faces of the confectionery composition; wherein the confectionery composition comprises a base portion comprising mannitol in an amount of about 8.0 to about 12.0% w/w of the candy layer and hydrogenated starch hydrolysate syrup in an amount of about 70.0 to about 74.0% w/w of the candy layer; a fondant portion comprising mannitol in an amount of about 4.0 to about 6.0% w/w of the candy layer; hydrogenated starch hydrolysate syrup in an amount of about 1.0 to about 3.0% w/w of the candy layer; and sorbitol syrup in an amount of about 1.0 to about 3.0% w/w of the candy layer; wherein the confectionery composition comprises crystalline particles of mannitol; a texturizing agent in an amount of about 1.0 to about 2.0% w/w of the candy layer; a fat having a melting point of about 35 to about 40° C. in an amount of about 3.0 to about 4.0% w/w of the candy layer; lecithin in an amount of about 0.001 to about 0.1% w/w of the candy layer; and glyceryl monostearate in an amount of about 0.01 to about 0.7% w/w of the candy layer, wherein the confectionery composition has a moisture content of about 6.5 to about 7.0% w/w; and wherein the first and second chewing gum layers include an elastomer.

In some embodiments, the multilayered confectionery provides a bouncier chew as compared to a similar confectionery containing a candy layer free of a texturizing agent.

In some embodiments, the multilayered confectionery comprises a candy layer comprising a confectionery composition; and a first chewing gum layer and a second chewing gum layer, wherein the candy layer is disposed between the first and second gum layers in a laminate configuration such that each layer is visible on at least two faces of the confectionery composition; wherein the confectionery composition comprises a base portion comprising mannitol in an amount of about 5.0 to about 20.0% w/w of the candy layer, wherein a portion of the mannitol comprises crystalline particles having crystals of an average length of about 1 to about 25 micrometers as determined by microscopic analysis, and hydrogenated starch hydrolysate syrup in an amount of about 70.0 to about 85.0% w/w of the candy layer; a texturizing agent in an amount of about 1.0 to about 2.0% w/w of the candy layer; a fat having a melting point of about 35 to about 40° C. in an amount of about 3.0 to about 4.0% w/w of the candy layer; lecithin in an amount of about 0.001 to about 0.1% w/w of the candy layer; and glyceryl monostearate in an amount of about 0.01 to about 0.7% w/w of the candy layer, wherein the confectionery composition has a moisture content of about 6.5 to about 7.0% w/w; and wherein the first and second chewing gum layers include an elastomer.

In some embodiments, a method of making a multilayered confectionery comprises preparing a candy layer comprising a confectionery composition as previously described; preparing a chewing gum layer comprising an elastomer; forming a multilayered confectionery wherein a first surface of the candy layer is in contiguous contact with a surface of the gum layer; optionally preparing a second chewing gum layer comprising elastomer, wherein a surface of the second gum layer is in contiguous contact with a second surface of the candy layer.

In some embodiments, a method of making a multilayered confectionery comprises preparing a candy layer comprising a confectionery composition comprising a base portion comprising mannitol and a hydrogenated starch hydrolysate syrup, and a fondant portion comprising mannitol and a hydrogenated starch hydrolysate syrup; wherein the base portion and the fondant portion are mixed to form a confectionery composition comprising crystalline particles of mannitol; preparing a chewing gum layer comprising an elastomer; forming a multilayered confectionery wherein a first surface of the candy layer is in contiguous contact with a surface of the gum layer; optionally preparing a second chewing gum layer comprising elastomer, wherein a surface of the second gum layer is in contiguous contact with a second surface of the candy layer.

In some embodiments, the multilayered confectionery is formed by a coextrusion process, a triple extrusion process, a laminate process, a rolling and scoring process, a chain die process, a rotary die process, or a cut and wrap process.

In some embodiments, the multilayered confectionery is prepared using a batch method or a continuous method.

In some embodiments, the multilayered confectionery is prepared into discrete units using a chain die, or rolling and scoring process.

In some embodiments, the multilayered confectionery is prepared by subjecting about 50 to 100% of a chewing gum mass used to prepare the chewing gum layer to more than one extrusion process.

In some embodiments, the multilayered confectionery is prepared subjecting about 50 to 100% of a chewing gum mass used to prepare the chewing gum layer to mixing times two or more times greater than typical processes to yield a homogenous chewing gum mass prior to coextrusion.

In some embodiments, the temperature of the candy layer and chewing gum layer are at least 40° C. when formed into the multilayered confectionery.

As used herein, the term "confectionery composition" includes a composition prepared from a sugar polyol and other optional ingredients, but is free of an elastomer component. Because sugar polyols are non-sucrose carbohydrates, such confectionery compositions are sugar-free confectionery compositions. The confectionery composition can sometimes be referred to as a "candy portion," "candy component," or "candy composition".

As used herein, the term "chewing gum" includes a composition comprising an elastomer, optionally present in a chewing gum base, and optionally further comprising water soluble chewing gum ingredients.

As used herein, the terms "bubble gum" and "chewing gum" are used interchangeably and are both meant to include any gum composition.

As used herein, the terms "elastomeric portion" and "gum base" refer to water insoluble material(s) and can include, but is not limited to, elastomers, bulking agents, waxes, elastomer solvents, emulsifiers, plasticizers, fillers, and mixtures thereof.

In one embodiment, the confectionery composition comprises a base portion comprising a sugar polyol and a fondant portion comprising a sugar polyol, wherein the base portion and the fondant portion are mixed to form a sugar-free confectionery composition.

The base portion of the confectionery composition is generally prepared from one or more sugar polyols and water. In one embodiment, the base portion is a cooked mixture of one or more sugar polyols and water. The types and amounts of sugar polyols for use in the base portion are described in further detail below.

The base portion may optionally contain additional base portion ingredients as described below.

The fondant portion of the confectionery composition is provided to impart a textural aspect to the confectionery composition. The fondant can be prepared to contain crystalline particles of sugar polyol that modulate the graining of the confectionery composition and thus modulate the texture of the confectionery composition. In one embodiment, the fondant comprises crystalline particles of sugar polyol having an average particle size of less than 50 micrometers, specifically about 1 to about 45 micrometers to provide a smooth mouthfeel when the confectionery composition is chewed. In another embodiment, the fondant comprises capillary fine crystals having an average length of ≤30 micrometers, specifically about 1 to about 25 micrometers as described further herein.

The fondant portion of the confectionery composition is generally prepared from one or more sugar polyols and water. The types and amounts of sugar polyols for use in the fondant are described in further detail below.

In several chewy candy embodiments, the fondant is present in the confectionery composition in an amount of about 2.0 to about 15.0% w/w, specifically about 4.0 to about 12.0% w/w, more specifically about 5.0 to about 10.0% w/w, and yet more specifically about 6.0 to about 7.5% w/w of the confectionery composition candy portion when prepared using a pulling process. Higher levels of fondant provide increased chewiness and softness to the confectionery composition candy portion. In multilayered formats containing a combination of layers of chewing gum and a layer of confectionery composition, these levels of fondant result in layers of chewy confectionery composition that do not exhibit undesired shape deformation caused by cold flow, specifically an "oozing" of the candy portion from the layered format. Lower levels of fondant can be used and the chewiness of the confectionery composition can still be achieved by using increased mechanical pulling or longer storage times at ambient temperature to promote graining.

In one embodiment, the moisture content of the fondant prior to its incorporation with the base portion can be about 6.5 to about 11.0% w/w of the fondant, specifically about 8.0 to about 9.5% w/w of the fondant, and yet more specifically about 8.5 to about 9.0% w/w.

The base portion or the fondant portion generally contains a sugar polyol, specifically two or more sugar polyols. The sugar polyol(s) used in the base portion can be the same or different from the sugar polyol(s) used in the fondant portion.

Suitable sugar polyols include, but are not limited to erythritol, galactitol, hydrogenated isomaltulose (isomalt), a hydrogenated starch hydrolysate, lactitol, maltitol, mannitol, polyglycitol, sorbitol, xylitol and mixtures thereof.

The sugar polyols can be used in crystalline form or amorphous form. Specifically, crystalline sugar polyols include crystalline erythritol, isomalt, lactitol, maltitol, mannitol, sorbitol, xylitol, and a combination thereof. When a crystalline sugar polyol is used in the confectionery composition or when the sugar polyol is allowed to crystallize in the composition, the resulting texture can become more grained or short. In one embodiment, the confectionery composition is chewy with a texture grained to a degree that allows for the quick delivery of flavor to the consumer.

Exemplary amorphous polyols include erythritol syrup, a hydrogenated starch hydrolysate syrup, isomalt syrup, lactitol syrup, maltitol syrup, mannitol syrup, sorbitol syrup, xylitol syrup, and a combination thereof.

In one embodiment, the base portion or the fondant portion contains a crystalline polyol such as mannitol or erythritol. In another embodiment, the base portion or the fondant portion contains an amorphous polyol such as a hydrogenated starch hydrolysate syrup.

In yet another embodiment, the base portion or the fondant portion contains a crystalline polyol and an amorphous polyol. In one embodiment, the crystalline polyol is mannitol or erythritol and the amorphous polyol is a hydrogenated starch hydrolysate syrup such as Lycasin 80/55.

When the base portion and the fondant portion both contain the same crystalline polyol (e.g. both contain mannitol or both contain isomalt), there is the advantage that the fondant forms seed crystals to promote graining in the base portion. Such graining can provide increased body and less cold flow shape deformation in a chewy confectionery composition and provide for a softer chewy texture. In the alternative, by having the base portion polyol be different from the fondant polyol (e.g., mannitol base and isomalt fondant, or isomalt base and mannitol fondant), graining can be inhibited thereby providing a different texture or having the base portion texture remain unchanged.

In one embodiment, the base portion comprises isomalt, erythritol, or mannitol as a first sugar polyol, and hydrogenated starch hydrolysate syrup as a second sugar polyol.

In another embodiment, the fondant portion comprises isomalt, erythritol, or mannitol as a first sugar polyol, and hydrogenated starch hydrolysate syrup as a second sugar polyol.

Isomalt is disaccharide alcohol. Isomalt can be prepared by hydrogenating isomaltulose. Products of the hydrogenation can include 6-O-α-D-glucopyranosyl-D-sorbitol (1,6-GPS); 1-O-α-D-glucopyranosyl-D-sorbitol (1,1-GPS); 1-O-α-D-glucopyranosyl-D-mannitol (1,1-GPM); 6-O-α-D-glucopyranosyl-D-mannitol (1,6-GPM); and mixtures thereof. Some commercially available isomalt materials include an almost equimolar mixture of 1,6-GPS, and 1,1-GPM. Other isomalt materials can include pure 1,6-GPS; 1,1-GPS; 1,6-GP; and 1,1-GPM. Still other isomalt materials can include mixtures of 1,6-GPS; 1,1-GPS; 1,6-GPM; and 1,1-GPM at any ratio. Exemplary commercially available isomalt includes Isomalt ST, Isomalt GS, Isomalt M, Isomalt DC, and Isomalt LM available from BENEO-Palatinit, Südzucker Group.

Suitable hydrogenated starch hydrolysates include those disclosed in U.S. Pat. No. 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a line of commercially available products manufactured by Roquette Freres of France, and HYSTAR™, a line of commercially available products manufactured by Lonza, Inc., of Fairlawn, N.J., also can be useful. LYCASIN® is a hydrogenated starch hydrolysate including sorbitol and maltitol.

An exemplary hydrogenated starch hydrolysate is LYCASIN® 80/55, having about 75% solids, and containing polyols having a degree of polymerization (DP) of about 4% w/w sorbitol, about 53% w/w maltitol, about 22% w/w DP3-5, and about 21% w/w DP6 and greater. Another exemplary hydrogenated starch hydrolysate is LYCASIN® 80/55 HDS, having about 85% solids, and containing about 4% w/w sorbitol, about 53% w/w maltitol, about 22% w/w DP3-5, and about 21% w/w DP6 and greater.

The total amount of sugar polyol present in the confectionery composition is about 50 to about 95% w/w of the confectionery composition, specifically about 70 to about 90% w/w of the confectionery composition, and more specifically about 75 to about 85% w/w of the confectionery composition.

In one embodiment, the base portion comprises about 30 to about 50% w/w isomalt and about 50 to about 70% w/w hydrogenated starch hydrolysate syrup of the base portion (dry weight), specifically about 35 to about 45% w/w isomalt and about 55 to about 65% w/w hydrogenated starch hydrolysate syrup of the base portion (dry weight).

In one embodiment, the fondant portion comprises about 65 to about 80% w/w isomalt and about 20 to about 35% w/w hydrogenated starch hydrolysate syrup of the fondant portion (dry weight), specifically about 70 to about 75% w/w isomalt and about 25 to about 30% w/w hydrogenated starch hydrolysate syrup of the fondant portion (dry weight).

In one embodiment, the ratio of isomalt to hydrogenated starch hydrolysate syrup is about 30:70 to about 50:50 based on the confectionery composition, specifically about 35:65 to about 45:55 based on the confectionery composition, and more specifically about 40:60 based on the confectionery composition. In a further embodiment, the confectionery composition having the aforementioned ratios is a chewy candy.

In another embodiment, the ratio of isomalt to hydrogenated starch hydrolysate syrup is about 75:25 to about 55:45 based on the confectionery composition, specifically about 70:30 to about 60:40 based on the confectionery composition, and more specifically about 65:35 based on the confectionery composition. In a further embodiment, the confectionery composition having the aforementioned ratios is a less chewy and more crunchy candy.

The isomalt of the confectionery composition can contain greater than 50% w/w of 1,6-GPS based on the total weight of the isomalt, specifically about 75 to about 80% w/w of 1,6-GPS based on the total weight of the isomalt. In one embodiment, the base portion, the fondant portion, or both portions contain isomalt having greater than 50% w/w of 1,6-GPS based on the total weight of the isomalt, specifically about 75 to about 80% w/w of 1,6-GPS based on the total weight of the isomalt.

In another embodiment, the confectionery composition comprises isomalt having a ratio of about 1:1 1,6-GPS to 1,1-GPM which can be present in the base portion, fondant portion or both.

In another embodiment, the base portion and optional fondant portion comprises erythritol as a first sugar polyol, and optionally hydrogenated starch hydrolysate syrup as a second sugar polyol. A chewy confectionery composition comprising erythritol can contain about 10 to about 30% w/w dry weight based on the total weight of confectionery composition (including the base and fondant portions), specifically about 12 to about 25, and more specifically about 15 to about 20% w/w.

In one embodiment, the base portion and fondant portion comprise mannitol as a first sugar polyol, and hydrogenated starch hydrolysate syrup as a second sugar polyol. The greater the amount of mannitol, the more grained the confectionery composition will be resulting in a less crunchy material that exhibits sufficient body to minimize cold flow shape deformation of the confectionery composition from a multilayered format. The amount of mannitol to achieve sufficient graining and body in a chewy confectionery is balanced by the ability to pull the confectionery sufficiently to aerate the confectionery mass, when a pulling step is employed. Too much mannitol results in rapid crystallization occurring before the confectionery mass can be pulled. To avoid this potential problem, the amount of mannitol is limited to prevent rapid crystallization or the pulling process is replaced with high energy mixing, such as using a sigma mixer. When a pulling step is desired to prepare a chewy confectionery composition, the total amount of mannitol present in the confectionery composition can be about 6 to about 22% w/w dry weight based on the total weight of confectionery composition (including the base and fondant portions), specifically about 8 to about 18, and more specifically about 10 to about 15% w/w; and the total amount of hydrogenated starch hydrolysate syrup based on the total weight of confectionery composition is about 65 to about 85% w/w, specifically about 70 to about 80% w/w, and more specifically about 73 to about 77% w/w. Greater amounts of mannitol (e.g., up to 30% w/w or more dry weight based on the total weight of the confectionery) can be used when high energy, intensive mixing is employed in the process.

In one embodiment, the fondant is a mannitol fondant comprising capillary fine crystals, mainly of mannitol, having an average length of ≤30 micrometers as described in Unexamined Japanese Patent Application Bulletin No. 2007-215450, Patent Application No. 2006-37910 to Michihide Obara, filing date Feb. 15, 2006, published Aug. 30, 2007, which is incorporated herein by reference in its entirety. It has been found that a mannitol fondant can be prepared having smoothness and property stability that are equivalent to those of a sugar fondant, and having a high crystal concentration. The term "property stability" means that such properties as the feeling on the tongue, smoothness, hardness, water retention (there are cases where this is called the syneresis prevention effect) are stable, and these properties are maintained well during ordinary storage, transport and handling.

The mannitol fondant comprising capillary fine crystals generally contains mannitol and a noncrystalline carbohydrate (e.g. amorphous polyol) other than the mannitol, as a crystal precipitation regulating agent. Use of the noncrystalline carbohydrate makes it possible to regulate the crystallization speed of the mannitol, to provide a mannitol fondant having smoothness similar to sugar fondant. Without the use of the noncrystalline carbohydrate, and preparing a mannitol fondant using conventional methods, large crystals of mannitol are obtained resulting in a rough fondant.

The mass ratio of the mannitol:noncrystalline carbohydrate in the mannitol fondant comprising capillary fine crystals is about 80:20 to about 10:90, specifically about 70:30 to about 20:80. When the mass ratio of the mannitol exceeds 80, the crystallization speed is fast, crude and large crystals precipitate, and the fondant is rough and becomes hard. When the mass ratio of the mannitol falls below 10, the crystal concentration is low and it does not provide a good fondant. In addition, when the mass ratio of the mannitol:noncrystalline carbohydrate is in a range of 80:20 to 10:90, the higher the mass ratio of mannitol is the lower the boiling temperature may be.

The mannitol can be D-mannitol, L-mannitol, or D, L-mannitol, specifically D-mannitol.

Figure 3:
FIG. 3 is a microscope photograph of a mannitol fondant comprising capillary fine crystals, each consisting mainly of mannitol and having an average length of 30 micrometers.

The determination of the capillary fine crystal lengths can be made using techniques known in the art such as microscopic analysis using a polarizing microscope or an electron microscope, for example. FIG. 3 is a microscope photograph of a mannitol fondant (1) comprising capillary fine crystals (2), each consisting mainly of mannitol and having an average length of ≤30 micrometers, and noncrystalline carbohydrate (3) as a crystal precipitation regulating agent present in the area around the capillary fine crystals (2).

The noncrystalline carbohydrate of the mannitol fondant comprising capillary fine crystals refers to a carbohydrate that does not crystallize at any concentration or temperature zone in an aqueous state, and which does not impair the production of or the stability of the quality after production of the resulting mannitol fondant. Exemplary noncrystalline carbohydrates include, starch syrup (e.g. glucose syrup, corn syrup), reduced starch syrup (e.g., hydrogenated starch hydrolysate), reduced maltose starch syrup (e.g., maltitol syrup), coupling sugar (e.g., oligosaccharide such as Oligo GGF™ a trisaccharide composed of D-galactose, D-glucose and D-fructose), oligomers (e.g., lacto-sucrose, fructo-oligosaccharide, soybean oligosaccharide, etc.), dietary fibers (e.g, glucomannan, indigestible dextrin, polydextrose, cellulose, gum arabic, pullulan, agar agar, sodium alginate, and polysaccharides like starch, dextrin, etc), and a combination thereof.

Certain noncrystalline carbohydrates are suitable for preparation of a mannitol fondant comprising capillary fine crystals having an average length of ≤30 μm, but which may exhibit insufficient water retention (syneresis prevention effect) for a particular application. These noncrystalline carbohydrates include for example starch syrup and reduced starch syrup. Use of a water retention improvement agent in combination with starch syrup or reduced starch syrup can be used to provide the desired water retention. Exemplary water retention improvement agents include certain noncrystalline carbohydrates such as gelatins, celluloses (crystal cellulose, methyl cellulose, hydroxypropyl methyl cellulose, carboxymethyl cellulose, etc.), gums, algins, agar-agar, glucomannan, and the like, and a combination thereof. The amount of water retention improvement agent can be about 0 to about 30 weight %, specifically 0.05 to 30 weight %, and more specifically 0.5 to 10 weight % based on the total weight of the mannitol fondant comprising capillary fine crystals.

In one embodiment, an emulsifier may also be added and employed as a crystal regulating agent. Exemplary emulsifiers include sucrose fatty acid esters, glycerin fatty acid esters, sorbitan fatty acid esters, propylene glycol fatty acid esters, lecithin, and the like, and a combination thereof.

The amount of emulsifier can be about 0.01 to about 2 weight %, and more specifically about 0.1 to about 1 weight % based on the total weight of the mannitol fondant comprising capillary fine crystals.

In another embodiment, a combination of emulsifier and water retention improvement agent is used in a combined amount of about 0.05 to about 30 weight %, and more specifically about 0.1 to about 10 weight % based on the total weight of the mannitol fondant comprising capillary fine crystals. The emulsifier may have an HLB of about 3 to about 11.

Additional additives may be added to the mannitol fondant comprising capillary fine crystals provided the capillary fine crystals having an average length of 30 micrometers are formed. Exemplary additional additives include acidulants, flavoring agents, coloring agents, and the like, and a combination thereof.

A generalized process to prepare the mannitol fondant comprising capillary fine crystals comprises boiling a liquid mixture of mannitol, noncrystalline carbohydrate, and water; and stirring the liquid mixture at a high speed while continuing to cool the liquid to obtain the capillary fine crystals, each consisting mainly of the mannitol and having an average length of 30 micrometers. The boiling temperature is chosen based on the mass ratio of the mannitol and the noncrystalline carbohydrate. Exemplary boiling temperatures are about 100 to about 134° C. under atmospheric pressure, and specifically about 120 to about 132° C.

The boiling temperature may be regulated to control the moisture of the fondant, which may be 30 weight % and under, and specifically about 10 to about 20 weight %. Concentration may optionally be performed under reduced pressure.

After the liquid mixture is boiled, it is cooled to about 95 to about 100° C., and then stirred at high speed while the cooling is continued to form the capillary fine crystals. High speed stirring can be carried out at 55 to 594 rpm under atmospheric pressure, for about 30 minutes to about 1 hour.

In an exemplary embodiment, a mannitol fondant having capillary fine crystals, each consisting mainly of mannitol and having an average length of ≤30 micrometers, is prepared by adding forty grams of water to 700 g mannitol powder (available from Towa-Kasei Co., Ltd.) and 300 grams of reduced starch syrup (HS-300 available from Hayashibara KK) to form a liquid mixture. The liquid mixture was boiled up to 128° C., cooled to 95° C. and subjected to high speed stirring at 132 rpm to 594 rpm with a stirrer (KM-800 made by KENMIX Co., Ltd.) for 30 minutes until fine crystals were obtained. Similar fondants were prepared by varying the mass ratio of mannitol powder to reduced starch syrup. Ratios of 20:80; 30:70; 40:60; 50:50; 60:40; and 70:30 D-Mannitol powder:reduced starch syrup provided fondants having capillary fine crystals, each consisting mainly of the mannitol and having an average length of ≤30 μm, and that are not rough, and that have smoothness and property stability that are equivalent to those of sugar fondant. Ratios of 10:90 and 80:20 D-Mannitol powder:reduced starch syrup provided fondants with a little roughness, yet have the smoothness and property stability equivalent to sugar fondant. Microscopic analysis of these fondants revealed the fondants contain 90% or more capillary fine crystals whose average length is 30 micrometers and under. A ratio of 70:30 D-Mannitol powder:reduced starch syrup provided a rougher fondant containing 90% or more capillary fine crystals whose average length is 50 micrometers and above by microscopic analysis.

In one embodiment, a fondant can be prepared from crystalline mannitol, hydrogenated starch hydrolysate syrup. It has been found that chewy confectionery compositions can be prepared from fondants containing hydrogenated starch hydrolysate syrups containing higher amounts of sorbitol so that the mannitol crystallization can be inhibited long enough to incorporate higher amounts of mannitol in the fondant during preparation, but allow for sufficient graining once the candy composition is prepared. The hydrogenated starch hydrolysate syrup can generally contain about 1:0.5 to 1:1.5 sorbitol to maltitol, specifically about 1:0.8 to 1:1.2, more specifically about 1:0.9 to about 1:1.1, and yet more specifically about 1:1 sorbitol to maltitol. When a hydrogenated starch hydrolysate syrup is used that does not have the desired ratio of sorbitol to maltitol, a combination of a hydrogenated starch hydrolysate syrup having low amounts of sorbitol and a hydrogenated starch hydrolysate syrup containing higher amounts of sorbitol (sorbitol syrup) can be used to result in the desired ratio. For example, a hydrogenated starch hydrolysate syrup containing about 50 to about 55% maltitol and about 8% sorbitol can be combined with a sorbitol syrup containing about 45 to about 54% sorbitol. The sorbitol syrup can be about 70% solids w/w of the sorbitol syrup (about 28.5 to 31.5% w/w water) and can contain about 45.0 to about 54.0% w/w D-sorbitol (e.g., Polyol 70/100 available from Roquette America, Inc). Amounts of hydrogenated starch hydrolysate syrups used to prepare the fondant can be about 15 to about 30% w/w of the fondant with water when a sorbitol syrup is employed or about 35 to about 60% w/w of the fondant with water when no sorbitol syrup is used. When a sorbitol syrup is employed, it can be present in amounts of about 7 to about 12% w/w of the fondant.

The use of the sorbitol syrup in a mannitol fondant allows for the preparation of a chewy confectionery composition at higher cook temperatures and results in a chewy confectionery having good body, lack of crunchiness, and minimal cold flow shape deformation ("oozing") from multilayered formats. Mannitol based fondant prepared without the sorbitol syrup can contain up to about 57% w/w mannitol based on the weight of the fondant when swept or scraped surface mixing equipment is used to prepare the fondant. Lower amounts of mannitol, about 33 to about 48% w/w based on the weight of the fondant, can be used to prepare the fondant in the absence of the sorbitol syrup when sigma blade or other similar high energy, intensive mixing equipment is used in the preparation of the chewy candy. If pulling will be employed using a mannitol fondant free of sorbitol syrup, the amount of mannitol is reduced to about 22% w/w of the fondant. Mannitol fondant prepared with the sorbitol syrup can contain mannitol in an amount of about 35 to about 60% w/w (dry weight) of the fondant; about 25 to about 40% w/w of the fondant including water.

In another embodiment, the chewy confectionery compositions can be prepared with a mannitol fondant wherein the crystalline polyol is mannitol having a median particle size of ≤40 micrometers, specifically about 1 to about 35 micrometers, and yet more specifically about 10 to about 30 micrometers as measured by laser light diffraction techniques.

In several embodiments, chewy confectionery compositions can be prepared without the use of a fondant when sufficient amounts of crystalline polyols are used to promote graining of the confectionery composition. In one embodiment, the crystalline polyol, such as those previously described, is chosen so that at least a substantial portion of the crystalline polyol has very small particle size to provide a grained confectionery product with a smooth mouthfeel. In one embodiment, the crystalline polyol is mannitol having crystals of an average length of ≤30 micrometers as determined by microscopic analysis, specifically having crystals of an average length of about 1 to about 25 micrometers.

In one embodiment, the chewy confectionery produced without a fondant, but with a crystalline polyol having a very small particle size, is prepared using a high energy mixer such as a sigma mixer to ensure a chewy product exhibiting minimal cold flow is produced.

In an embodiment, a fondant is employed to prepare a chewy confectionery at the start of a continuous process using a high energy mixer, but is subsequently not used once the process continuously has some earlier material and later material in the mixer at the same time allowing the earlier material to grain the later material.

A wide variety of one or more conventional additives can be used as an additional ingredient present in the confectionary composition, including fats, oils, texturizing agents, emulsifiers, food acids, additional sweeteners, high intensity sweeteners, flavor modulators or potentiators, flavors, coloring agents, medicaments, oral care agents, throat care agents, breath fresheners, mineral adjuvants, bulking agents, acidulants, buffering agents, sensates (e.g., warming agents, cooling agents, tingling agents, effervescent agents), thickeners, mouth moisteners, flavor enhancing composition, antioxidants (e.g., butylated hydroxytoluene (BHT), butylated hydroxyanisole (BHA), or propyl gallate), preservatives, functional ingredients (e.g., a breath freshener, a dental care component, an active, an herbal, an effervescing system, an appetite suppressor, a vitamin, a micronutrient, a mouth moistening component, a throat care component, an energy boosting agent, a concentration boosting agent), a gas, an abrasive, particles of a second confectionery, a mixture thereof, and the like. Some of these additives can serve more than one purpose within the confectionery composition. Furthermore, some of these additives can be at least partially encapsulated.

In one embodiment, the additional ingredient is combined with the base portion prior to the introduction of the fondant portion.

In another embodiment, the additional ingredient is added with or after the introduction of the fondant portion to the base portion.

In yet another embodiment, the additional ingredient is an optional component of the base portion.

The confectionery composition may further comprise a type and amount of texturizing agent to provide a range of desired texture characteristics to the finished confectionery products, from a soft and pliable chewy composition to a hard and friable material. When higher amounts of the texturizing agent such as gelatin is used in a chewy confectionery composition, the composition has more body and tends to exhibit less cold flow shape deformation when prepared into multilayered formats.

The texturizing agent can be selected from the group consisting of a gelatin (pork, beef, etc.), albumin, other hydrocolloid material such as natural gums, a modified starch, a cellulose (including polydextrose), a nanoclay, and a combination thereof.

The gel strength of the gelatin can be greater than or equal to about 125 bloom, specifically greater than or equal to about 200 bloom, and more specifically from about 130 bloom to about 250 bloom.

In one embodiment, a powdered gelatin is used to prepare a chewy confectionery composition in lieu of a portion of dissolved gelatin in water. Use of the powdered gelatin allows for the incorporation of larger amounts of gelatin without adding additional water into the composition.

Exemplary hydrocolloid materials include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums.

When used, the amount of texturizing agent, specifically gelatin, in the confectionery composition can be about 0.5 to about 3.0% w/w, specifically about 1.0 to about 2.5% w/w, and more specifically about 1.5 to about 2.0% w/w of the confectionery composition.

The confectionery composition may further contain an oil or fat. Suitable oils and fats for use in the confectionery compositions include partially or fully hydrogenated vegetable or animal fats, such as coconut oil, corn oil, cottonseed oil, palm kernel oil, peanut oil, sesame oil, soy bean oil, beef tallow, and lard, among others, as well as cocoa butter, milk fat, a glyceride, and the like.

The oil or fat of the confectionery composition can contain both trans fatty acids, non-trans fatty acids, or a combination thereof. In one embodiment, the oil or fat is free of trans fatty acids.

In one embodiment, the iodine value of the fat/oil can be about 10 or less, specifically 5 or less. In another embodiment, the iodine value of the fat/oil can be about 45 to about 55, specifically about 48 to about 53. Within this embodiment, the fat/oil may contain monounsaturated fatty acids.

The amount of oil/fat present in the confectionery composition can be about 2.0 to about 6.0% w/w, specifically about 3.0 to about 5.0% w/w of the confectionery composition.

In one embodiment, a chewy confectionery composition contains an oil/fat having a melting temperature similar to body temperature to allow for good release of flavor and good chew texture when the confectionery composition is consumed. The melting temperature can be about 35 to about 40° C., specifically about 36 to about 39° C., and more specifically about 37 to about 38° C.

In one embodiment, the fat/oil is palm oil, hydrogenated coconut oil, and a combination thereof.

The confectionery composition may further contain an emulsifier. When used in a chewy confectionery composition, the emulsifier contributes to the degree of aeration that can be achieved in the confectionery thereby contributing to the overall body of the confectionery composition. Increased body results in minimized cold flow shape deformation of the chewy confectionery composition from multilayered format during processing and storage. Suitable emulsifiers include glyceryl monostearate, lecithin, a fatty acid monoglyceride, a diglyceride, propylene glycol monostearate, and a combination thereof.

The emulsifier can be present in the confectionery composition at about 0.1 to about 1.0% w/w of the confectionery composition, specifically about 0.15 to about 0.8, and more specifically about 0.2 to about 0.6% w/w.

In one embodiment, a specific emulsifier is a combination of lecithin and glyceryl monostearate at a ratio of lecithin to glyceryl monostearate of about 1:1 to about 1:50, specifically about 1:2 to about 1:20, and more specifically about 1:5 to about 1:7.

The amount of lecithin present in a chewy confectionery composition can be about 0.001 to about 0.1% w/w, specifically about 0.01 to about 0.06% w/w, and more specifically about 0.03 to about 0.04% w/w. The amount of glyceryl monostearate present in a chewy confectionery composition can be about 0.01 to about 0.7% w/w, specifically about 0.1 to about 0.5% w/w, and more specifically about 0.2 to about 0.4% w/w.

In one embodiment, the confectionery composition comprises an emulsifier and a texturizing agent, wherein the ratio of the total amount of emulsifier to the total amount of texturizing agent is about 1:6 to about 1:9.

The confectionery composition may further include a food acid or salt thereof. Exemplary food acids and food acid salts include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and a combination thereof, and alkali metal salts thereof (e.g., sodium citrate dihydrate).

In one embodiment, the confectionery composition contains two or more different food acids/salts, for example citric acid and malic acid. In one embodiment, the food acid is a combination of citric and malic acid present in a ratio of about 2:1, specifically about 1.5:1, and more specifically about 1:1 citric to malic acid.

The food acid or salt thereof can be present in the confectionery composition in an amount of about 0.5 to about 4.0% w/w of the confectionery composition, specifically about 1.0 to about 3.75% w/w, and yet more specifically about 1.5 to about 3.0% w/w. It has been found that high levels of food acid provides an upfront flavor sensation when the confectionery composition is consumed, and specifically when formatted as a multilayered confectionery comprising a chewing gum layer.

A "high intensity sweetener" as used herein means agents having a sweetness greater than the sweetness of sucrose. In some embodiments, a high intensity sweetener has a sweetness that is at least 100 times that of sugar (sucrose) on a per weight basis, specifically at least 500 times that of sugar on a per weight basis. In one embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, and protein based sweeteners. Combinations comprising one or more sweeteners or one or more of the foregoing types of sweeteners can be used. Without being limited to particular sweeteners, representative categories and examples include:

water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, and a combination thereof;

water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and a combination thereof; dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, neotame, and a combination thereof;

water-soluble sweeteners derived from naturally occurring water-soluble sweeteners, such as steviosides and stevia derived compounds such as but not limited to steviol glycosides such as rebaudiocides including rebaudiocide A, and the like, lo han quo and lo han quo derived compounds such as iso-mogroside V and the like, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; 4,6,1',6'-tetradeoxy-sucrose, and a combination thereof;

protein based sweeteners such as thaumaoccous danielli, talin, and a combination thereof; and amino acid based sweeteners.

The high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, and a combination thereof.

A sweet taste in the confectionery can come from flavor modulators or potentiators and/or from flavorants as well as from sweeteners. Flavor potentiators can consist of materials that intensify, supplement, modify or enhance the taste or aroma perception of an original material without introducing a characteristic taste or aroma perception of their own. Flavor modulators can impart a characteristic of their own that complements or negates a characteristic of another component. In some embodiments, flavor modulators or potentiators are designed to intensify, supplement, modify, or enhance the perception of flavor, sweetness, tartness, umami, kokumi, saltiness and combinations thereof can be included. Thus, the addition of flavor modulators or potentiators can impact the overall taste of the comestible. For example, flavors can be compounded to have additional sweet notes by the inclusion of flavor modulators or potentiators, such as vanilla, vanillin, ethyl maltol, furfual, ethyl propionate, lactones, and a combination thereof.

Exemplary flavor modulators or potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), and a combination thereof. In some embodiments, sugar acids, sodium chloride, potassium chloride, sodium acid sulfate, and a combination thereof are used. In other embodiments, glutamates such as monosodium glutamate, monopotassium glutamate, hydrolyzed vegetable protein, hydrolyzed animal protein, yeast extract, and a combination thereof are included. Further examples include adenosine monophosphate (AMP), glutathione, and nucleotides such as inosine monophosphate, disodium inosinate, xanthosine monophosphate, guanylate monophosphate, and a combination thereof. Further examples of flavor potentiator compositions that impart kokumi are also included in U.S. Pat. No. 5,679,397 to Kuroda et al.

The amount of flavor modulators, flavor potentiators, and flavorants used herein can be a matter of preference subject to such factors as the type of final comestible product composition, the individual flavor, the confectionary base employed, and the strength of flavor desired. Thus, the amount of flavoring can be varied in order to obtain the result desired in the final product and such variations are within the capabilities of those skilled in the art without the need for undue experimentation.

Flavorants that can be used include those artificial or natural flavors known in the art, for example synthetic flavor oils, natural flavoring aromatics and/or oils, oleoresins, extracts derived from plants, leaves, flowers, fruits, and the like, and a combination thereof. Nonlimiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, and a combination thereof. Specific flavorants are mints such as peppermint, spearmint, artificial vanilla, cinnamon derivatives, and various fruit flavors.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

The flavoring agent can be used in liquid or solid form. When used in solid (dry) form, suitable drying means such as spray drying the oil can be used. Alternatively, the flavoring agent can be encapsulated, absorbed onto water soluble materials by means known in the art, for example cellulose, starch, sugar, maltodextrin, gum arabic, and the like. In some embodiments, the flavoring agents can be used in physical forms effective to provide an initial burst of flavor or a prolonged sensation of flavor.

Sensate compounds can include cooling agents, warming agents, tingling agents, effervescent agents, and combinations thereof. Coolants are additives that provide a cooling or refreshing effect in the mouth, in the nasal cavity, or on skin. For example, among the useful cooling agents are included menthane, menthone, ketals, menthone ketals, menthone glycerol ketals, acyclic carboxamides, substituted p-menthanes, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-2,2-diisopropylbutanamide, N-ethyl-p-menthane-3-carboxamide (WS-3), ethyl ester of N-[[5-methyl-2-(1-methylethyl)cyclohexyl]carbonyl]glycine (WS5), as well as the substantially pure ethyl ester of N-[[5-methyl-2-(1-methylethyl)cyclohexyl]carbonyl]glycine as disclosed in U.S. Pat. No. 7,189,760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methyl-cyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehta-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; Menthol methyl ether, menthyl pyrrolidone carboxylate; 2,5-dimethyl-4-(1-pyrrolidinyl)-3(2H)-furanone; cyclic α-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:

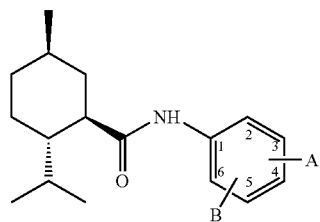

wherein B is selected from H, CH3, C2H5, OCH3, 0C2H5; and OH; and wherein A is a moiety of the formula-CO-D, wherein D is selected from the following moieties: (i)-NR1R2, wherein R' and R2 are independently selected from H and C1-C8 straight or branched-chain aliphatic, alkoxy-alkyl, hydroxyalkyl, araliphatic and cycloalkyl groups, or R1 and R2 together with the nitrogen atom to which they are attached form part of an optionally-substituted, five- or six-membered heterocyclic ring; (ii)-NIICH2COOCH2CH3, —NHCH2CONH2, —NHCH2CH$_2$OCH3, —NHCH2CH2OH, —NHCH2CH(OH)CH2OH and (iii) a moiety selected from the group consisting of:

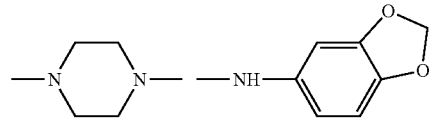

as disclosed in PCT Patent Application WO2006/125334 to Bell et al which is incorporated in its entirety herein by reference, among others. Other compounds include the alpha-keto enamines disclosed in U.S. Pat. No. 6,592,884 to Hofmann et al which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698,181; 6,277,385; 6,627,233; 7,030,273. Still other suitable cooling agents are further described in the following U.S. patent applications, all of which are incorporated in their entirety by reference hereto: U.S. 2005/0222256; 2005/0265930.

Warming components can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropol alcohol, iso-amylalcohol, benzyl alcohol, glycerine, and a combination thereof.

In some embodiments, tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum*

*peperitum*), including the ingredients known as Saanshool-I, Saanshool-II and Sanshoamide; perillartine; 4-(1-menthoxymethyl)-2-phenyl-1,3-dioxolane; black pepper extract (piper nigrum), including the active ingredients chavicine and piperine; Echinacea extract; Northern Prickly Ash extract; trans-pellitorin, and red pepper oleoresin. In some embodiments, alkylamides extracted from materials such as jambu or sanshool may be included. Additionally, in some embodiments, a sensation is created due to effervescence. Such effervescence is created by combining an alkaline material with an acidic material, either or both of which may be encapsulated. In some embodiments, an alkaline material may include alkali metal carbonates, alkali metal bicarbonates, alkaline earth metal carbonates, alkaline earth metal bicarbonates and mixtures thereof. In some embodiments, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates include those disclosed in U.S. Pat. Nos. 6,780,443, 6,159,509, 5,545,424, and 5,407,665, each of which is incorporated by reference herein in its entirety.

The confectionery compositions described herein can be formulated to comprise significant amounts of flavor not used in conventional confections providing an initial burst of flavor with a long lasting flavor profile. Typical amounts of flavor found in candies range from 0.5 to 0.6% w/w based on the total candy weight. The candy portion of the confectionery composition can contain flavorants, flavor modulators, flavor potentiators, sensates, and a combination thereof in an amount of about 0.5 to about 3.0% w/w, specifically about 0.75 to about 2.0% w/w of the candy composition or more. Processing difficulties arise when flavorants are added to the base portion in amounts greater than can be incorporated quick enough to prevent the flavorant from running off the candy mass and remaining on mixing equipment. It has been found that flavorants, particularly oily flavorants, tend to resist incorporation into the candy mass when added in large amounts including amounts greater than about 0.5% w/w of the candy composition. Particular processing techniques were developed to overcome the difficulty in incorporating large amounts of flavors by incorporating flavorants into the fondant or creating a food acid/flavorant premix which is subsequently incorporated into the base portion.

In one embodiment, the fondant comprises flavorants, flavor modulators, flavor potentiators, sensates, and a combination thereof to provide high levels of flavor in the sugar-free confectionery composition. The amount of flavorant present in the fondant can be about 0.01 to about 5.0% w/w of the fondant, specifically about 1.0 to about 4.0% w/w, and more specifically about 2.0 to about 3.0% w/w.

In a particular embodiment, the flavorants, flavor modulators, flavor potentiators, sensates, and a combination thereof is combined with an emulsifier and mixed with the fondant prior to introducing the fondant to the base portion. Exemplary emulsifiers are those previously discussed, specifically lecithin. The amount of flavorants, etc. which is combined with the emulsifier can be about 1.0 to about 11.25% w/w, specifically about 2.0 to about 7.5% w/w, and more specifically about 4.5% w/w based on the total weight of the fondant. The amount of emulsifier which is combined with the flavorants, etc. can be about 0.02 to about 0.5% w/w, specifically about 0.4 to about 0.25% w/w, and more specifically about 0.1% w/w based on the total weight of the fondant.

In another embodiment, a food acid/flavorant premix is prepared and subsequently added to the base portion to achieve high levels of flavorant in the final composition. The premix can be prepared by mixing an excess amount of food acid by weight to an amount of flavorant to form a paste, specifically about 20:1, more specifically about 10:1, yet more specifically about 5:1, and still more specifically about a 1:1 weight ratio of food acid to flavorant. The flavorant is absorbed by the food acid resulting in the minimization of flash off of flavor and minimization of flavor loss during mixing as discussed above.

To provide an upfront cooling, warming or tingling sensation, the confectionery composition, when formatted into multilayered confectionery comprising a chewing gum portion, a sensate in an amount of about 0.8 to about 3.0% w/w, specifically about 1.0 to about 2.0% w/w of the confectionery composition (candy) or more.

In one embodiment, the sugar-free candy portion contains small amounts of spray-dried flavorants, specifically less than 10% w/w of the total flavorant is spray-dried flavorant, more specifically is essentially free of spray-dried flavorant, and yet more specifically free of spray-dried flavorant. Spray-dried flavorants often contain other materials such as maltodextrin, starch, or cellulose, in addition to the flavor, which can affect the balance for crystallization of the polyol in the candy portion making it difficult to achieve the desired graining/texture consistency, and can contribute to flavors that are not as clean.

Coloring agents (colors, colorants, colorings) can be used in amounts effective to produce a desired color for the confectionery composition. Suitable coloring agents include pigments, which can be incorporated in amounts up to about 6% w/w of the composition. For example, titanium dioxide can be incorporated in amounts up to about 2% w/w, and specifically less than about 1% w/w by weight of the composition. Suitable coloring agents also include natural food colors and dyes suitable for food, drug, and cosmetic applications. Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), and a combination thereof. In some embodiments, certified colors can include FD&C aluminum lakes, and a combination thereof. A full recitation of all FD&C colorants and their corresponding chemical structures may be found in the Kirk-Othmer Encyclopedia of Chemical Technology, 4th Edition, in volume 1 at pages 492-494, which text is incorporated herein by reference.

Coloring agents can also include food grade glitter which can be incorporated into the confectionery or adhered to a surface. The edible glitter can include a food grade colorant and a carrier such as a sugar, a sugar polyol, a disaccharide, a polysaccharide, a hydrocolloid material, or a combination thereof. Exemplary glitter includes the commercially available Edible Glitter™ from Watson Inc. of West Haven, Conn.

The coloring agent can include food grade pearlescent pigments prepared from mica optionally coated with titanium dioxide, iron oxide, and the like.

Exemplary breath fresheners include to zinc citrate, zinc acetate, zinc fluoride, zinc ammonium sulfate, zinc bromide, zinc iodide, zinc chloride, zinc nitrate, zinc fluorosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based material, carbon-based material, enzymes such as laccase, and a combination thereof. Breath fresheners can include essential oils as well as various aldehydes and alcohols. Essential oils used as breath fresheners can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, orange, and a combination thereof. Aldehydes such as cinnamic aldehyde and salicylaldehyde can be used. Additionally, chemicals such as menthol, carvone, iso-garrigol, and anethole can function as breath fresheners.

Exemplary mouth moisteners include saliva stimulators such as acids and salts including acetic acid, adipic acid, ascorbic acid, butyric acid, citric acid, formic acid, fumaric acid, glyconic acid, lactic acid, phosphoric acid, malic acid, oxalic acid, succinic acid, and tartaric acid. Mouth moisteners can include hydrocolloid materials that hydrate and can adhere to oral surface to provide a sensation of mouth moistening. Hydrocolloid materials can include naturally occurring materials such as plant exudates, seed gums, and seaweed extracts or they can be chemically modified materials such as cellulose, starch, or natural gum derivatives. Furthermore, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums. Mouth moisteners can include modified natural gums such as propylene glycol alginate, carboxymethyl locust bean gum, low methoxyl pectin, and a combination thereof. Modified celluloses can be included such as microcrystalline cellulose, carboxymethlcellulose (CMC), methylcellulose (MC), hydroxypropylmethylcellulose (HPCM), hydroxypropylcellulose (MPC), and a combination thereof.

Similarly, humectants, which can provide a perception of mouth hydration, can be included. Such humectants can include glycerol, sorbitol, polyethylene glycol, erythritol, xylitol, and a combination thereof. Additionally, in some embodiments, fats can provide a perception of mouth moistening. Such fats can include medium chain triglycerides, vegetable oils, fish oils, mineral oils, and a combination thereof.

Suitable acidulants illustratively include acetic, citric, fumaric, hydrochloric, lactic and nitric acids as well as sodium citrate, sodium bicarbonate and carbonate, sodium or potassium phosphate and magnesium oxide, potassium metaphosphate, sodium acetate, and a combination thereof.

Exemplary buffering agents include sodium bicarbonate, sodium phosphate, sodium hydroxide, ammonium hydroxide, potassium hydroxide, sodium stannate, triethanolamine, citric acid, hydrochloric acid, sodium citrate, and a combination thereof.

The buffering agent may be present in the sugar-free candy portion in an amount up to 2.0% w/w based on the total weight of the sugar-free candy portion, specifically about 0.01 to about 1.5% w/w, more specifically about 0.1 to about 1.3% w/w, and yet more specifically about 0.5 to about 1.0% w/w.

Suitable oral care agents include breath fresheners, tooth whiteners, antimicrobial agents, tooth mineralizers, tooth decay inhibitors, topical anesthetics, mucoprotectants, stain removers, oral cleaning, bleaching agents, desensitizing agents, dental remineralization agents, antibacterial agents, anticaries agents, plaque acid buffering agents, surfactants and anticalculus agents, and a combination thereof.

Throat care or throat-soothing ingredients include analgesics, antihistamines, anesthetics, demulcents, mucolytics, expectorants, antitussive, and antiseptics. In some embodiments, throat soothing agents such as honey, propolis, aloe vera, glycerine, menthol and a combination thereof.

Medicaments can be included in the confectionery or chewing gum composition. Nonlimiting illustrative categories and specific examples include antihistamines, decongestants (sympathomimetics), antitussives (cough suppressants), anti-inflammatories, homeopathic agents, expectorants, anesthetics, demulcents, analgesics, anticholinergics, throat-soothing agents, antibacterial agents, antiviral agents, antifungal agents, antacids, antinauseants, caffeine, chemotherapeutics, diuretics, psychotherapeutic agents, cardiovascular agents, various alkaloids, laxatives, appetite suppressants, ACE-inhibitors, anti-asthmatics, anti-cholesterolemics, anti-depressants, anti-diarrhea preparations, anti-hypertensives, anti-lipid agents, acne drugs, amino acid preparations, anti-uricemic drugs, anabolic preparations, appetite stimulants, bone metabolism regulators, contraceptives, endometriosis management agents, enzymes, erectile dysfunction therapies such as sildenafil citrate, fertility agents, gastrointestinal agents, homeopathic remedies, hormones, motion sickness treatments, muscle relaxants, osteoporosis preparations, oxytocics, parasympatholytics, parasympathomimetics, prostaglandins, respiratory agents, sedatives, smoking cessation aids such as bromocryptine or nicotine, tremor preparations, urinary tract agents, anti-ulcer agents, anti-emetics, hyper- and hypo-glycemic agents, thyroid and anti-thyroid preparations, terine relaxants, erythropoietic drugs, mucolytics, DNA and genetic modifying drugs, and nutritional supplements, including nutraceuticals, micronutrients, vitamins and co-enzymes. The pharmaceutically acceptable salts and pro-drugs of the medicaments are also included unless specified otherwise. Some of these medicaments can serve more than one purpose. Combinations of the foregoing types of optional medicaments can be used. Two or more medicaments that have activity against the same or different symptoms can be used together in a combination.

In one embodiment, the confectionery composition comprises abrasives such as sugar polyol particles (e.g., isomalt particles as disclosed in U.S. Pat. No. 7,300,679 incorporated herein by reference), silicas, and the like.

In one embodiment, the confectionery composition comprises particles of a second confectionery such as a chewy candy, a crunchy candy, a low boiled candy, a hard boiled, a fondant, a caramel, a jelly, a gummy, a nougat, a fruit leather, a nut paste, chocolate, fudge, and a combination thereof.

In another embodiment, the confectionery composition comprises particles of hard boiled candy incorporated within the matrix of the confectionery composition which is itself not a hard boiled candy. In one embodiment, particles of gasified hard candy (e.g., "pop rocks" type of candy prepared by injecting compressed (600 PSI) carbon dioxide gas into a boiled candy mixture) is incorporated into a chewy confectionery composition. The particles may be coated with chewing gum-tolerant polymeric material as a moisture barrier to maintain the integrity of the compressed gas until the product is consumed. Such a coating is also suitable for coating and protecting any moisture sensitive ingredients, for example food acids, medicaments, oral care ingredients, throat care or throat-soothing ingredients, buffering agents, breath fresheners, and the like. Exemplary gum-tolerant polymeric material includes non-toxic vinyl polymers such as polyvinyl acetate, and the like.

In one embodiment, the confectionery composition is a chewy composition. In another embodiment, the confectionery composition is a crunchy composition. The level of chewiness or crunchiness of the confectionery composition is modulated by the amount of moisture present coupled with the type and degree of sugar polyol crystallization. Typically, lower amounts of moisture result in a harder texture, while higher amounts of moisture result in a softer texture. The cook temperature used to prepare the confectionery composition determines the moisture content and thus determines the texture of crunchy/chewy and stand up/body. More discussion of cook temperature is provided herein.

The type of crystallization also contributes to the overall texture of the product. Uniform planes of crystallization result in a crunchier product, while localized crystal formation will provide a product that is less crunchy. Additionally, the degree of crystallization affects the confectionery composition's texture. Generally, the higher the degree of crystallization i.e. the more grained the product is, the softer the bite. In some embodiments there can be an interaction between the type and degree of crystallization. For example, a high degree of uniform planes of crystallization will result in a product that is crunchier than a low degree of uniform planes of crystallization. For another example, a high degree of localized crystal formation will provide a product with little or no crunch and a softer bite while a low degree of localized crystal formation will provide a product that may have some crunch and is chewier. Thus, by controlling the moisture content and the type and degree of crystallization in the final confectionery product, a range of textures can be obtained from chewy to crunchy/crispy.

In several embodiments, the type of crystallization observed is localized crystal formation of the sugar polyols. Use of certain types of sugar polyol will result in more or less crystallization. For example, use of hydrogenated starch hydrolysate syrup is less prone to crystallization as compared to mannitol, which tends to provide confectionery products with a higher degree of crystallinity.

In several embodiments, a fondant is used to modulate the graining of the confectionery composition to obtain a chewy or crunchy texture as the fondant can impart a degree of crystallinity to the product. In lieu of the fondant, crystalline powder material such as a crystalline sugar polyol can be added to the confectionery composition as a crystallization promoter to impart a degree of crystallinity. In an alternative embodiment, crystallinity can be introduced into the confectionery composition by the use of cooking kettles or processing equipment containing residual particulate material such as crystalline sugar polyols.

In one embodiment, a chewy confectionery composition is prepared having a balance of properties to result in a stable layer in the multilayered compositions. The chewy composition exhibits sufficient body so that it does not exhibit cold flow shape deformation and "ooze" from the multilayered compositions, thereby maintaining visually distinct portions of a confectionery component and adjacent layers of confectionery, e.g., chewing gum over time. Further embodiments of the chewy confectionery results in a chewy texture without converting into a crunchy texture over time.

The chewy confectionery can exhibit a body/hardness, density, or viscosity suitable for use in multilayered compositions. It is known that the viscosity of sugar free confections tend to be lower than corresponding sugar matrices making sugar free confections more difficult to process and requiring more "body" to withstand pressures of adjacent layers in a multilayerd format.

The confectionery composition generally has a moisture content of no more than about 12% w/w, specifically no more than about 6.0% w/w of the confectionery. In one embodiment, a chewy confectionery composition has a moisture content of about 6.0 to about 8.0% w/w, specifically about 6.3 to about 7.5% w/w, and more specifically about 6.5 to about 7.0% w/w. In another embodiment, a crunchy confectionery composition has a moisture content of about 4.0 to about 5.0% w/w of the confectionery, specifically about 4.3 to about 4.7% w/w.

In one embodiment, the final cook temperature used to prepare the chewy confectionery composition is about 126 to about 145° C., specifically about 128 to about 136° C., more specifically about 130 to about 134° C., and yet more specifically about 132° C. to give a final moisture content of about 6 to about 7. This final cook temperature provides a chewy confectionery composition having desirable chewiness with good body having minimal shape deformation upon processing into multilayered formats and upon standing over time.

The confectionery composition can be prepared using a continuous process, a batch process, and a combination thereof. The confectionery composition can be prepared using conventional equipment, such as fire cookers, vacuum cookers, or scraped-surface cookers (also referred to as high speed atmospheric cookers). The confectionery composition can be prepared by a general process of preparing a base portion by applying heat to a mixture of sugar polyol and water to increase the solids content of the mixture by the removal of moisture. In another embodiment, base portion can be created by increasing the solids content without a heat process such as by incorporating a solid sugar polyol into an aqueous sugar polyol syrup.

Once the base portion is prepared ingredients such as fats/oils, emulsifiers, texturizing agents, colors, acids, flavors, and other optional ingredients can be mixed with the base. In the foregoing methods, the additive(s) are specifically mixed for a time effective to provide a uniform distribution of the materials, for example about 4 to about 10 minutes.

The resulting mixture can be tempered on a cooling table and cooled to about 40 to about 55, specifically about 45 to about 55° C. prior to the addition of the fondant portion, if used. In embodiments where fondant is used, the fondant can be incorporated into the mixture of base portion and other ingredients and the resulting material can be further worked by pulling, kneading, etc. to achieve a desired consistency.

The fondant can generally be prepared by mixing a desired sugar polyol or polyols with water. In several embodiments, the amount of water is used such that a slurry is prepared thus retaining some of the crystalline nature of the polyol. In an alternate embodiment, the sugar polyol and water are heated, optionally to reduce the level of water, and then allowed to cool to result in polyol crystal formation.

In one embodiment, the confectionery composition once formed is pulled for about 4 to about 12 minutes, specifically about 6 to about 10 minutes, and yet more specifically about 7 to about 9 minutes.

In one embodiment, the confectionery composition once formed is pulled for about 8 to about 12 minutes, specifically about 9 to about 10 minutes to provide a chewy confectionery composition.

In another embodiment, the confectionery composition once formed is pulled for about 2 to about 5 minutes, specifically about 3 to about 4 minutes to provide a crunchy confectionery composition.

Once the composition has been properly tempered, it can be cut into workable portions or otherwise formed into desired shapes and sizes using forming techniques such as are known in the art or formed into multilayer confectionery compositions as described herein. In one embodiment, the resulting tempered material may be allowed to stand for a period of time to allow polyol crystal formation, if desired.

The process to prepare the confectionery composition may further include graining the confectionery by seeding or by mechanical agitation.

In another embodiment, the candy layer is prepared from a sugar-free, hard boiled candy to result in a crunchy layer of amorphous candy. Sugar-free, hard boiled candies are generally hard and essentially amorphous confectionery products low in moisture prepared by the removal of moisture from cooked sugar polyol syrups. Exemplary sugar polyols are disclosed herein.

The sugar-free hard candy can contain about 0.1 to about 3 w/w % water based on the total weight of the hard candy, specifically about 0.2 to about 2.5 w/w %, and more specifically about 0.5 to about 2.0 w/w %.

In general, preparation of the hard candy involves: mixing and heating, forming a melt a sugar polyol and optionally, other sugar polyols and/or a diluent such as water; cooking the melt; removing excess moisture from the melt; cooling the melt with mixing until the melt is a plastic-like, workable mass; while the melt is a plastic-like mass, incorporating optional ingredients; and forming the plastic-like mixture into a desired size and shape.

Methods known in the art of making hard confectioneries include those utilizing fire cookers, vacuum cookers, and scraped-surface cookers (aka high speed atmospheric cookers).

In a suitable example of a method utilizing fire cookers, the desired quantity of the sugar polyol is dissolved in water by heating in a kettle until dissolved. Additional optional sugar polyols can be added and cooking continued until a final temperature of about 145-165° C. is achieved. The mix is then cooled, worked as a plastic-like mass, and admixed optional ingredients such as flavors, colorants, high-intensity sweeteners, and the like.

A suitable example of a method utilizing vacuum cookers, the sugar polyol components are boiled at a temperature of about 125-132° C., vacuum is applied and additional water is boiled off without extra heating. When cooking is complete, the mass is a semi-solid having a plastic-like consistency. Optional conventional additives are admixed into the mass at this point by conventional methods.

In a suitable example of a method using scraped-surface cookers, a film of a mixture of the sugar polyol components is spread on a heat exchange surface and heated to about 165-170° C. within a few minutes. The composition is then rapidly cooled to about 100-120° C. and worked as a plastic-like mass, mixing in any optional conventional additives.

In the foregoing methods, the cooking temperature should be sufficiently high to drive water from the mix. Where vacuum is employed, lower temperatures can typically be used. In the foregoing methods, the additive(s) are specifically mixed for a time effective to provide a uniform distribution of the materials, for example about 4 to about 10 minutes. Once the composition has been properly tempered, it can be cut into workable portions or otherwise formed into desired shapes and sizes using forming techniques such as are known in the art.

In one embodiment, a confectionery composition comprises a base portion comprising about 9.7 to about 10.2 w/w % mannitol, about 67.0 to about 77.0% w/w % hydrogenated starch hydrolysate syrup, about 3.2 to about 3.8 w/w % oil/fat having a melting temperature of about 35 to about 40° C., about 0.1 to about 0.3 w/w % glycerol monostearate, about 0.03 to about 0.05 w/w % lecithin, colorant, about 1.0 to about 1.4 w/w % citric acid, about 0.6 to about 1.0 w/w % malic acid, about 0.5 to about 0.8 w/w % flavor, and about 1.0 to about 1.6 w/w % gelatin 250 bloom; and a fondant portion comprising about 4.6 to about 5.4 w/w % mannitol, about 0.6 to about 1.0 w/w % water, about 1.6 to about 3.5 to about 4.2 w/w % hydrogenated starch hydrolysate syrup having a ratio of sorbitol to maltitol of about 1:1; wherein all amounts are based on the total weight of the confectionery composition; and wherein the fondant portion and base portion are mixed to form a sugar-free confectionery composition.

In one embodiment, the confectionery composition is a fruit leather. Fruit leathers are typically prepared from a puree of a fruit and dried to the consistency of leather. An exemplary extrudable fruit leather can be prepared by combining corn syrup, sugar, fruit puree, starch, emulsifier, food acid and a vegetable oil, extruding and cooking the mixture at about 95 to about 100° C. The fruit leather can optionally contain a conventional additive as an additional ingredient present in the confectionary composition as previously described herein. The fruit leather may be coextruded with a chewing gum to form multilayered confectionery compositions.

Pectin jelly generally comprises a sugar/glucose syrup and pectin. The pectin jelly can optionally contain a conventional additive as an additional ingredient present in the confectionary composition as previously described herein. The pectin jelly may be coextruded with a chewing gum to form multilayered confectionery compositions.

Fudge can generally be prepared from condensed milk, a fat component (e.g., butter), granulated sugar, glucose syrup, and flavor. An exemplary fudge can be prepared by combining sweet condensed milk (41.36% w/w), sugar (19.65% w/w) and butter (11.69% w/w) in a steam jacketed kettle and heating with stirring until the temperature reaches 150° F. Flavor such as vanilla can be added during the mixing step. Heating is continued until the mass reaches a temperature of 238° F. at which point the steam is turned off and chocolate (25.85% w/w) is added with vigorous stirring. Next, glucose syrup (1.03% w/w) is added with stirring. The mass is cooled with stirring until it reaches a temperature of 180-190° F. and then poured onto a marble slab and worked until a desired crystallization/texture is reached. The fudge can optionally contain a conventional additive as an additional ingredient present in the confectionary composition as previously described herein. The fudge may be coextruded with a chewing gum to form multilayered confectionery compositions.

In one embodiment, the multilayered confectionery contains two or more chewing gum layers comprising an elastomer, the layers can be the same or differing compositions.

In another embodiment, the multilayered confectionery contains two or more layers of confectionery composition, the layers can be the same or differing compositions.

Any number of configurations of confectionery composition and chewing gum can be prepared. Multilayered configurations include a layer of chewing gum and a layer of confectionery composition (candy) wherein each instance of a confectionery composition layer is a chewy candy, a crunchy candy, a low boiled candy, a hard boiled candy, a fondant, a caramel, a jelly specifically a pectin jelly, a gummy, a nougat, a fruit leather, an edible film, a nut paste, chocolate, fudge, or a combination thereof. It will be understood that a discrete multilayer product can contain one or more types of confectionery composition particularly when there is more than one confectionery composition layer. Exemplary multilayered configurations are provided in the table below.

In one embodiment, the layers are in a laminate configuration such that each layer is visible on all but two faces of the confectionery composition.

In another embodiment, the layers are in a laminate configuration such that each layer is visible on at least two faces of the confectionery composition.

In another embodiment, the layers are in a jelly roll configuration where all of the layers are visible from a cross section of the confectionery.

In yet another embodiment, the layers are in discrete concentric layers where all of the layers are visible from a cross section of the confectionery. The concentric layers can have any number of shapes including circular, square, rectangle, triangle, pentagon, hexagon, heptagon, octagon, star, animal, and the like.

Figure 1B:
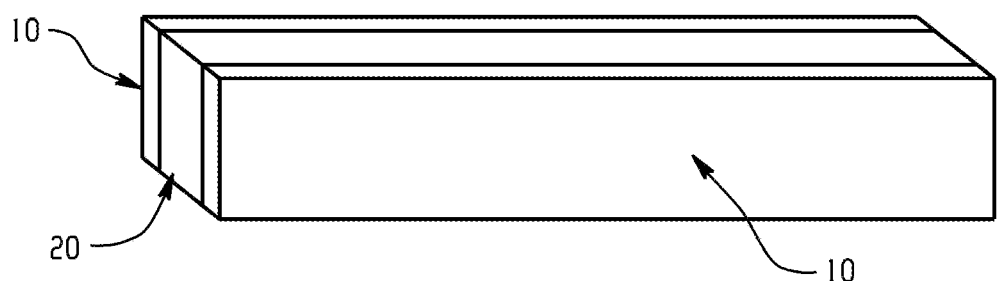
FIG. 1b is illustrative of an exemplary slab multilayered composition having chewing gum layers (10) and a center layer of confectionery composition (20) having a length (l), width (w), and height (h) where the center layer is only visible from the surface defined by the length and width and the surface defined by the width and height, where l>w >h.
Figure 1C:
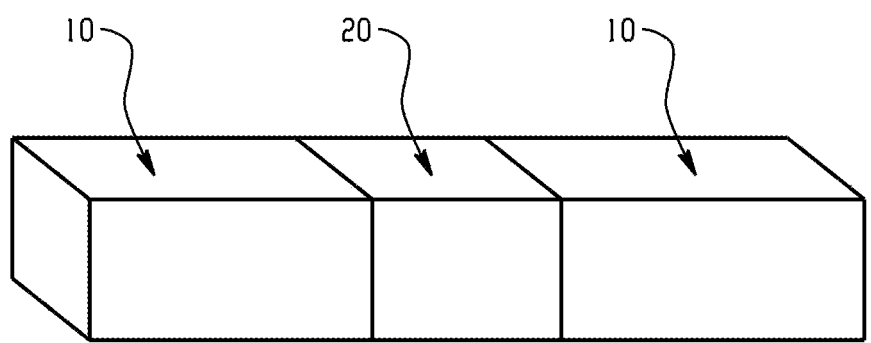
FIG. 1c is illustrative of an exemplary slab multilayered composition having chewing gum layers (10) and a center layer of confectionery composition (20) having a length (l), width (w), and height (h) where the center layer is only visible from the surface defined by the length and height and the surface defined by the length and width, where l>w >h.
Figure 2:
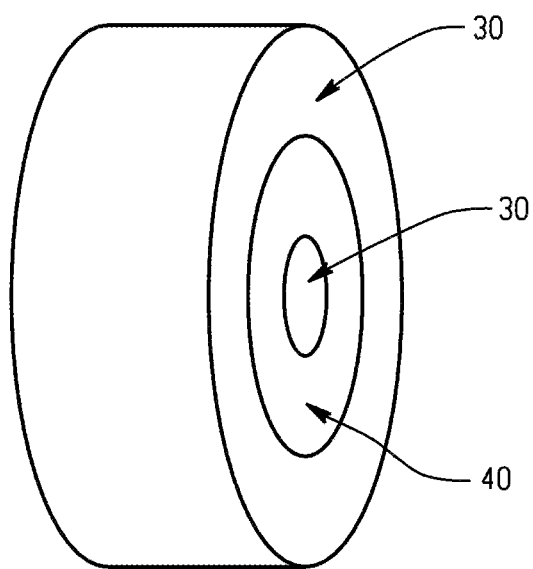
FIG. 2 is illustrative of an exemplary multilayered composition having concentric layers of chewing gum (30) and a layer of confectionery composition (40).

| | |
|---|---|
| Sandwich format | One layer of confectionery composition (candy) encased between two layers of chewing gum. |
| | One layer of chewing gum encased between two layers of confectionery composition (candy). |
| | Two layers of confectionery composition (candy) encased between three layers of chewing gum in an alternating fashion where the centermost layer and outside layers are chewing gum. |
| | Two layers of chewing gum encased between three layers of confectionery composition (candy) in an alternating fashion where the centermost layer and outside layers are confectionery composition (candy). |
| | Multiple, alternating layers of chewing gum and confectionery composition (candy) where the outside layers can be chewing gum, confectionery composition (candy), or one of each; the total number of layers can be 3, 4, 5, 6, 7, 8, 9, 10, 11, 12, or more. |
| | Any of the sandwich formats above having a length (l), width (w), and height (h) where the center layer(s) is only visible from the surface defined by the length and width and the surface defined by the width and height, where $l > w \geq h$ or $l \geq w > h$. (See for example, FIG. 1b) |
| | Any of the sandwich formats above having a length (l), width (w), and height (h) where the center layer(s) is only visible from the surface defined by the length and height and the surface defined by the width and height, where $l > w \geq h$ or $l \geq w > h$. (See for example, FIG. 1a) |
| | Any of the sandwich formats above having a length (l), width (w), and height (h) where the center layer(s) is only visible from the surface defined by the length and height and the surface defined by the length and width, where $l > w \geq h$ or $l \geq w > h$. (See for example, FIG. 1c) |
| Centerfill | A centerfill having a shell of chewing gum and a centerfill of confectionery composition (candy). |
| | A centerfill having a shell of confectionery composition (candy) and a centerfill of chewing gum. |
| Skeined rope derived from centerfill | Multiple layers of overlapping centerfilled compositions compacted to a laminated format. (See generally U.S. Pat. No. 5,017,385) The number of centerfilled ropes overlapping one another can be 2, 3, 4, 5, or more. |
| Skeined rope derived from sandwich format | Multiple layers of overlapping ropes of sandwich format compacted to a laminated format. The number of sandwich forms overlapping one another can be 2, 3, 4, 5, or more. |
| Multipatterned format | Ropes of sandwich format, centerfill, or individual ropes of chewing gum or confectionery composition (candy) compacted together or embedded one within another to produce a multipatterned product having a length (l), width (w), and height (h). (See generally, U.S. Pat. Nos. 5,538,742 and 7,112,345) |
| | Ropes of sandwich format, twisted and compacted to produce a multipatterned product having a length (l), width (w), and height (h). (See generally, U.S. patent application Publication No. 20070137502) |
| Pan coated | Each of the foregoing multilayered configurations may be pan coated. |

In one embodiment, the multilayered confectionery comprises alternating layers of sugar-free confectionery composition and chewing gum layers.

In some embodiments, in order to provide a uniform mouthfeel for the consumer, the texture of the sugar-free candy layer is substantially the same as the texture of the gum layer. In several of these embodiments, the texture of the confectionery does not change over time so that the sugar-free candy texture at the time of manufacturing into a multilayered format is substantially the same as the texture of the sugar-free candy layer at consumption. In those embodiments using a chewy confectionery composition, textures such as chewiness and hardness are matched to the chewiness and hardness of the gum layer. In one embodiment, a chewy confectionery composition matches the chewiness and body of a chewing gum composition also present in a multilayered composition. Furthermore, the chewy confectionery composition maintains its chewiness and body over time such that at the time of consumption it exhibits little or no change from the chewiness and body at the time of manufacture of the multilayered composition.

In an alternative embodiment, the texture of the sugar-free candy layer is different from the gum layer, for example when a crunchy confectionery composition is used for the sugar-free candy layer. Mismatching textures between the layers can provide the consumer with a new and interesting mouthfeel and sensation.

In one embodiment, the water activity of the sugar-free candy layer is substantially the same as the water activity of the gum layer. In another embodiment, the water activity of the sugar-free candy layer is within about 10% of the water activity of the gum layer, specifically within about 5%, and yet more specifically within about 1%. Matching the water activity of the various confectionery layers allows for the minimization of moisture transfer from areas of high water activity to areas of low water activity, thereby minimizing the potential for texture changes in the confectionery layers.

In another embodiment, the water activity of the sugar-free candy layer or the gum layer is about 0.20 to about 0.60, specifically about 0.25 to about 0.40.

The multilayered confectionery can contain any ratio of sugar-free candy to chewing gum, specifically about 1 to about 99% w/w of the sugar-free candy layer and about 99 to about 1% w/w of the gum layer based on the combined weight of sugar-free candy layer and gum layer, more specifically about 20 to about 40% w/w of the sugar-free candy layer and about 60 to about 80% w/w of the gum layer based on the combined weight of sugar-free candy layer and gum layer, and yet more specifically about 25 to about 35% w/w of the sugar-free candy layer and about 65 to about 75% w/w of the gum layer based on the combined weight of sugar-free candy layer and gum layer. Within these ranges, the weight ratio of a chewy sugar-free candy layer to gum layer can be about 20:80, about 25:75, about 30:70, about 35:65, about 33:67, or about 50:50.

In one embodiment, the multilayered confectionery has a chewing gum layer split into a first portion and a second portion and wherein the confectionery comprises about 25% w/w to about 35% w/w of the sugar-free candy layer and about 25% w/w to about 35% w/w of the first portion of the chewing gum layer and about 25% w/w to about 35% w/w of the second portion of the chewing gum layer. The format can be of a sandwich form having the first and second portions of the chewing gum as outer layers and the sugar-free candy as the inner layer.

In one embodiment, the multilayered confectionery has a sugar-free candy layer split into a first portion and a second portion and wherein the confectionery comprises about 25% w/w to about 35% w/w of the chewing gum layer and about 25% w/w to about 35% w/w of the first portion of the sugar-free candy layer and about 25% w/w to about 35% w/w of the second portion of the sugar-free candy layer. The format can be of a sandwich form having the first and second portions of the sugar-free candy as outer layers and the chewing gum as the inner layer.

In one embodiment of a multilayered confectionery, a barrier layer is provided between two adjacent layers to reduce or prevent migration of an ingredient between the layers. The ingredient can include water, flavor, oil, color, combinations thereof, and the like. Suitable moisture barriers include materials having a low moisture permeability including lipid-based coatings (fat, oil, wax, or a combination thereof) such as compound coating and chocolate, confectionery glazes such as the glazes containing shellac, zein, cellulose-based coatings (e.g., methylcellulose, hydroxypropyl cellulose and the like), and the like. Exemplary moisture barriers are available under the line of products named CAPOL from Centerchem, Inc. Suitable fat or oil barriers include cellulose-based coatings (e.g., methylcellulose, hydroxypropyl cellulose and the like).

The chewing gum layer generally contains an elastomer. The elastomer may be present in a gum base which may further include a fat, an emulsifier, and optionally an additional gum base ingredient selected from the group consisting of a wax, a filler, an antioxidant, and a combination thereof.

The amount of gum base employed will vary greatly depending upon various factors such as the type of base used, the consistency of the chewing gum desired, and the other components used in the composition to make the final chewing gum layer. In general, the gum base will be present in amounts of about 5 wt % to about 60 wt % of the chewing gum layer, specifically about 25 wt % to about 50 wt %, more specifically about 30 to about 45% w/w, and yet more specifically about 35 to about 40% w/w of the chewing gum layer.

Exemplary elastomers to be used in the chewing gum layer include both natural and synthetic elastomers and rubbers, for example, substances of vegetable origin such as chicle, crown gum, nispero, rosadinha, jelutong, perillo, niger gutta, tunu, balata, gutta-percha, lechi-capsi, sorva, gutta kay, and the like. Synthetic elastomers such as butadiene-styrene copolymers, polyisobutylene, isobutyleneisoprene copolymers, polyethylene, a combination thereof, and the like are also useful. The gum base can include a non-toxic vinyl polymer, such as polyvinyl acetate and its partial hydrolysate, polyvinyl alcohol, and a combination thereof. When utilized, the molecular weight of the vinyl polymer can range from about 3,000 up to and including about 94,000. Additional useful polymers include: crosslinked polyvinyl pyrrolidone, polymethylmethacrylate; copolymers of lactic acid, polyhydroxyalkanoates, plasticized ethylcellulose, polyvinyl acetatephthalate and combinations thereof.

In one embodiment, the elastomer is present in an amount of about 0.2% w/w to about 15% w/w by weight of the chewing gum layer, specifically about 3.0% w/w to about 8.0% w/w by weight of the gum layer.

Conventional additives can be included in the gum base in effective amounts such as plasticizers or softeners to provide a variety of desirable textures and consistency properties. Because of the low molecular weight of these components, the plasticizers and softeners are able to penetrate the fundamental structure of the gum base making it plastic and less viscous. Suitable plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and a combination thereof.

Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, and the like can also be incorporated into the gum base to obtain a variety of desirable textures and consistency properties.

When a wax is present in the gum base, it softens the polymeric elastomer mixture and improves the elasticity of the gum base. The waxes employed will have a melting point below about 60° C., and preferably between about 45° C. and about 55° C. The low melting wax can be a paraffin wax. The wax can be present in the gum base in an amount from about 6% to about 10%, and preferably from about 7% to about 9.5%, by weight of the gum base.

In addition to the low melting point waxes, waxes having a higher melting point can be used in the gum base in amounts up to about 5%, by weight of the gum base. Such high melting waxes include beeswax, vegetable wax, candelilla wax, carnuba wax, most petroleum waxes, and the like, and mixtures thereof.

The chewing gum layer or gum base can optionally contain conventional elastomer solvents to aid in softening the elastomer base component, for example trepanned resins such as polymers of alpha-pinene or beta-pinene, methyl, glycerol or pentaerythritol esters of rosins or modified rosins and gums, such as hydrogenated, dimerized or polymerized rosins, or combinations comprising at least one of the foregoing resins, the pentaerythritol ester of partially hydrogenated wood or gum rosin, the pentaerythritol ester of wood or gum rosin, the glycerol ester of wood rosin, the glycerol ester of partially dimerized wood or gum rosin, the glycerol ester of polymerized wood or gum rosin, the glycerol ester of tall oil rosin, the glycerol ester of wood or gum rosin, the partially hydrogenated wood or gum rosin, the partially hydrogenated methyl ester of wood or rosin, and the like. The elastomer solvent can be used in amounts of about 5 wt % to about 75 wt %, of the gum base, and specifically about 45 wt % to about 70 wt % of the gum base.

The gum base can include effective amounts of bulking agents such as mineral adjuvants, which can serve as fillers and textural agents. Suitable mineral adjuvants include calcium carbonate, magnesium carbonate, alumina, aluminum hydroxide, aluminum silicate, talc, tricalcium phosphate, tricalcium phosphate and the like, which can serve as fillers and textural agents. These fillers or adjuvants can be used in the gum base in various amounts. Specifically the amount of filler, when used, will be present in an amount of greater than about 0 wt % to about 60 wt % of the gum base, and more specifically from about 20 wt % to about 30 wt % of the gum base.

Suitable emulsifiers include distilled monoglycerides, acetic acid esters of mono and diglycerides, citric acid esters of mono and diglycerides, lactic acid esters of mono and diglycerides, mono and diglycerides, polyglycerol esters of fatty acids, ceteareth-20, polyglycerol polyricinoleate, propylene glycol esters of fatty acids, polyglyceryl laurate, glyceryl cocoate, gum arabic, acacia gum, sorbitan monostearates, sorbitan tristearates, sorbitan monolaurate, sorbitan monooleate, sodium stearoyl lactylates, calcium stearoyl lactylates, diacetyl tartaric acid esters of mono- and diglycerides, glyceryl tricaprylate-caprate/medium chain triglycerides, glyceryl dioleate, glyceryl oleate, glyceryl lacto esters of fatty acids, glyceryl lacto palmitate, glyceryl stearate, glyceryl laurate, glyceryl dilaurate, glyceryl monoricinoleate, triglyceryl monostearate, hexaglyceryl distearate, decaglyceryl monostearate, decaglyceryl dipalmitate, decaglyceryl monooleate, polyglyceryl 10 hexaoleate, medium chain triglycerides, caprylic/capric triglyceride, propylene glycol monostearate, polysorbate 20, polysorbate 40, polysorbate 60, polysorbate 80, polysorbate 65, hexylglyceryl distearate, triglyceryl monostearate, tweens, spans, stearoyl lactylates, calcium stearoyl-2-lactylate, sodium stearoyl-2-lactylate lecithin, ammonium phosphatide, sucrose esters of fatty acids, sucroglycerides, propane-1,2-diol esters of fatty acids, and a combination thereof.

Additional components of the chewing gum layer include a bulk sweetener, a softener system, a food acid, and a combination thereof. The gum layer may further comprise an ingredient selected from the group consisting of a high intensity sweetener, a sensate, a flavor, a color, a functional ingredient, an antioxidant, and a combination thereof.

The bulk sweetener for use in the chewing gum layer can include sugar sweeteners, sugarless sweeteners, and a combination thereof. Sugar sweeteners generally include saccharides. Suitable sugar sweeteners include mono-saccharides, di-saccharides and poly-saccharides such as but not limited to, sucrose (sugar), dextrose, maltose, dextrin, xylose, ribose, glucose, mannose, galactose, fructose (levulose), lactose, invert sugar, fructo oligo saccharide syrups, partially hydrolyzed starch, corn syrup solids, such as high fructose corn syrup, and a combination thereof.

The sugarless sweetener can be a sugar polyol as previously discussed above, specifically erythritol, galactitol, hydrogenated isomaltulose (isomalt), a hydrogenated starch hydrolysate, lactitol, maltitol, mannitol, polyglycitol, sorbitol, xylitol, and a combination thereof.

The bulk sweetener can be present in the multilayered confectionery in an amount of about 40 to about 60% w/w of the gum layer, specifically about 45 to about 55% w/w of the gum layer, and yet more specifically about 48 to about 53% w/w.

In one embodiment, the bulk sweetener is a sugar polyol selected from the group consisting of maltitol, sorbitol, and a combination thereof. The maltitol or sorbitol can be in powdered form. In a further embodiment, the bulk sweetener comprises a ratio of about 1:3 to about 1:5 sorbitol to maltitol, specifically about 1:3.5 to about 1:4.5, and more specifically about 1:4 sorbitol to maltitol.

In one embodiment, the chewing gum comprises an amount of erythritol, xylitol, or a combination thereof to provide for increased refreshment when consumed. The amount of erythritol, xylitol, or a combination thereof to provide increase refreshment, can be about 10% w/w or more based on the weight of the chewing gum, specifically about 10 to about 60, more specifically about 15 to about 50 and yet more specifically about 20 to about 40% w/w.

The chewing gum can further include a softener. Exemplary softeners include lanolin, palmitic acid, oleic acid, stearic acid, sodium stearate, potassium stearate, glyceryl triacetate, lecithin, glyceryl lecithin, glyceryl monostearate, propylene glycol monostearate, an acetylated monoglyceride, glycerine, a natural or synthetic wax, a hydrogenated vegetable oil, sorbitan monostearate, tallow, propylene glycol, and a combination thereof, specifically an acetylated monoglyceride, lecithin, glycerine, a hydrogenated starch hydrolysate (e.g., Lycasin 80/55), and a combination thereof.

The softener can be present in the multilayered confectionery in an amount of about 1 to about 5% w/w of the gum layer, specifically about 1.5 to about 4% w/w, and more specifically about 2 to about 3% w/w of the gum layer.

The food acid suitable for use in the gum layer include those previously discussed, such as acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and a combination thereof, specifically citric acid, malic acid, and a combination thereof. In one embodiment, the food acid is a combination of citric and malic acid present in a ratio of about 2:1, specifically about 1.5:1, and more specifically about 1:1 citric to malic acid.

The food acid can be present in the multilayered confectionery in an amount of about 0.01 to about 2.0% w/w of the gum layer, specifically about 0.1 to about 1.5% w/w, and more specifically about 0.3 to about 1.0% w/w of the gum layer.

The gum layer may further include a high intensity sweetener such as those previously discussed. Specific high intensity sweeteners for use in the gum layer include aspartame, neotame, sucralose, monatin, acesulfame potassium, an encapsulated form of the high intensity sweetener, and a combination thereof.

The amount of high intensity sweetener present in the multilayered confectionery can be about 2 to about 6% w/w of the gum layer, specifically about 3 to about 5% w/w of the gum layer.

The gum layer can further include a sensate selected from the group consisting of a cooling agent, a warming agent, a tingling agent, and a combination thereof. Exemplary sensates have been previously discussed above.

The amount of flavor, sensate, or combination thereof present in the gum layer can be up to about 5.0% w/w based on the total weight of the chewing gum, specifically about 1.0 to about 4.0% w/w, and more specifically about 2.0 to about 3.0% w/w.

The gum layer can further include a functional ingredient such as a breath freshener, a dental care component, an active, an herbal, an effervescing system, an appetite suppressor, a vitamin, a micronutrient, a mouth moistening component, a throat care component, an energy boosting agent, a concentration boosting agent, and a combination thereof. The functional ingredients for use in the gum layer include those previously discussed above for the confectionery composition.

The chewing gum itself can optionally include particles of hard boiled candy to provide a crunchy texture to the chewing gum. The particles can be of any size and shape. Exemplary mean diameters of particles of hard boiled candies include about 150 to about 10000 micrometers, specifically about 250 to about 5000 micrometer, and yet more specifically about 500 to about 1000 micrometers.

In one embodiment, the chewing gum used to prepare the multilayered confectionery is highly homogeneous. It has been found that the homogeneity of the chewing gum contributes to the processability of the multilayered confectionery having a layer of sugar-free candy and a layer of chewing gum, particularly a layer of sugar-free candy having two surfaces, each surface in contiguous contact with a chewing gum layer in a sandwich-like format. A gum mass having increased homogeneity can be achieved by using a chewing gum which has been worked longer than in traditional chewing gum processes. In one embodiment, at least 50% of the gum mass has been subject to more than one extrusion process (e.g., two or more passes through the extruder equipment) or subject to longer mixing times (e.g., three times more mixing, four times more, or greater) than typically used in traditional chewing gum processes. Increased mixing times or extrusion residence time leads to increased homogeneity.

The chewing gum layer composition can be prepared using standard techniques and equipment. In one exemplary process, a gum base is heated to a temperature sufficiently high to soften the base without adversely effecting the physical and chemical make up of the base, which will vary depending upon the composition of the gum base used, and is readily determined by those skilled in the art without undue experimentation. For example, the gum base can be conventionally melted to about 60° C. to about 160° C., or melted to about 150° C. to about 175° C., for a period of time sufficient to render the base molten, e.g., about thirty minutes, just prior to being admixed incrementally with the remaining ingredients of the base such as the plasticizer, fillers, the bulking agent or sweeteners, the softener and coloring agents to plasticize the blend as well as to modulate the hardness, viscoelasticity and formability of the base, and the flavor enhancing composition (as a concentrate with other additives or separately). Mixing is continued until a uniform mixture of the gum composition is obtained. Thereafter the gum composition mixture can be formed into desirable multilayered shape.

The gum layer composition can be prepared using a batch method or a continuous method and a combination thereof.

As used herein, "a continuous mixer" is processing equipment in which the various ingredients used to prepare a composition are fed substantially continuously into the device whilst those ingredients are being mixed and removed or ejected from the mixing apparatus. For example, in a continuous mixing extruder, some ingredients are substantially continuously introduced through various feed ports while others are introduced downstream, all the while the screws, blades or other mixing elements continuing to convey the mixture through the apparatus, all the while mixing the same. At a downstream portion of the extruder, the wholly or partly combined mass is ejected from the extruder by the force of the mass continually being conveyed and/or facilitated by an external pump.

In one embodiment, a method of making a multilayered confectionery comprises preparing a sugar-free candy layer comprising the confectionery composition; preparing a gum layer comprising the chewing gum layer; forming a multilayered confectionery wherein a first surface of the candy layer is in contiguous contact with a surface of the gum layer; optionally preparing a second gum layer, wherein a surface of the second gum layer is in contiguous contact with a second surface of the candy layer.

The processing equipment used to make the confectionery composition, chewing gum or multilayered composition can be monitored and/or controlled automatically. For example, the processing equipment can be coupled to a computerized system which allows the user to input certain and/or all of the operational parameters, including, e.g., feeding of the ingredients, mixing or processing the ingredients, conveying the ingredients. In certain embodiments, the system can be coupled to batch processing equipment, continuous processing equipment, or both if both types are used. In some embodiments, changing the input parameters used to control the processing can create changes in the final product as discussed hereinabove, e.g., texture, hardness, crunch, etc. For example, the ingredient and/or processing temperatures and/or feed rates of the ingredients can be monitored and fed back to a central unit so that the operator can adjust as needed and/or in which the system can automatically adjust. After the ingredients have been mixed, the formation, processing into a particular shape and/or form can also be monitored and fed back for the operators input and/or automatic adjustment. An audible and/or visual alarm can also be implemented to signal the operator when the system detects a problem and/or a variation in one or more processing parameters.

In an embodiment, preparation of the multilayered confectionery is made when the candy and the chewing gum components are at a temperature of at least 40° C. and more specifically about 45° C. to about 50° C. It has been found that the temperature of the components at the time they are brought into contact affects the adherence of the layers. Temperatures of the components below 40° C. can result in poor adhesion of the layers to one another resulting in delamination.

The multilayered confectionery can be formed by a coextrusion process, a triple extrusion process, a laminate process, a molding process, a compression process, a rolling and scoring process, a chain die process, a rotary die process, or a cut and wrap process.

The multilayered compositions can be shaped using devices and techniques that are known in the candy art. For example, the multilayered compositions can be shaped by hand, with molds and/or dies, cutters, pullers, stretchers, extruders and the like. Non-limiting examples of molds that can be used include, flexible (e.g., made of silicone), metal, plastic, glass, and the packaging itself (e.g., by placing the unshaped mass into the pack), such as a blister pack. Combinations of these may also be employed.

The portions of candy and chewing gum can be included such that each is visibly distinct to the consumer. The order of candy and chewing gum in the multilayer confectionery can include alternating layers of each component, wherein substantially all of the outside surface of the confectionery is candy portion, substantially all of the outside surface of the confectionery is chewing gum, and any ratio in between.

The multilayered confectionery can be prepared into discrete units in the form of slabs, sticks, pellets, balls, cubes, and the like. The formation into discrete units can be achieved using a chain die, or rolling and scoring process.

There is no limitation to the size of the discrete unit of the multilayered confectionery. In exemplary embodiments, each discrete unit is about 1.5 to about 3.0 grams, specifically about 1.8 to about 2.7 grams, and more specifically about 2.3 to about 2.5 grams as a slab or stick format.

In the embodiments where the multilayered compositions provide visually distinct portions of the confectionery component and the chewing gum component, no dusting media (e.g., dusting powder, rolling compound and the like) is used to provide a clean cross section of the various layers. In one embodiment, a guillotine knife is used to cut the multilayered confectionery into discrete units having visually distinct layers on one, two, three, four or more sides of the unit. Optionally, in place of a dusting powder, an edible oil anti-adherent may be used to prevent the confectionery from sticking to the knives or other processing equipment. The oil may be applied directly to the confectionery prior to cutting. Exemplary oil anti-adherent includes light mineral oil. In an alternative, pan release agents may be used on the processing equipment.

In another embodiment, the multilayered composition is surface treated using materials and techniques known in the art. Exemplary surface treatments include panned coating (hard or soft), particulate coating (e.g., sanding, dusting, etc.), and treatment with oil optionally including flavors.

The particulate coating can include a powdered sugar, a particulate sugar polyol, and the like. The particulate layer can be applied by any method known in the art including dusting where electrostatic forces adhere the particulate layer to the confectionery or sanding where a binder such as water or syrup helps to adhere the particulates to the confectionery.

The coating may be present in an amount from about 2 to about 60% w/w, specifically about 10 to about 45% w/w, and yet more specifically about 25 to about 30% w/w by weight of the total confectionery piece.

The multilayered confectionery can be packaged using techniques and equipment known in the art. For example gum stick packaging, packaging tins, blister trays, and the like can be used. In one embodiment is a packaged product that includes a multilayered confectionery wherein the package has indicia on an outer surface that is indicative of the product contained in the package.

When mannitol/hydrogenated starch hydrolysate chewy confectionery compositions are employed in a multilayered confectionery, it has been found that maintaining the finished product above the glass transition temperature of the chewy composition allows for the chewy composition to maintain its soft, chewy texture. The finished product can be maintained at about 21 to about 30° C., specifically about 24 to about 28° C., and more specifically about 25 to about 27° C. Products prepared from the chewy confectionery can be allowed to age/grain for a time such that optimal graining is achieved. In an exemplary embodiment, the aging/graining time can be about 1 day to about 6 months, specifically about 5 days to about 30 days, more specifically about 12 days to about 25 days, and yet more specifically about 15 to about 20 days.

The candy layer and the gum layer of the multilayered confectionery can each contain flavor to provide a complementary flavor profile, a contrasting flavor profile (e.g, candy layer is sweet while the gum layer provides a sour taste), or a sequential flavor profile. The presence of the candy layer provides an upfront burst of flavor which transitions to the longer lasting flavor of the gum portion providing a unique flavor experience. The transition from candy flavor to gum flavor can occur after about 5 to about 20 seconds into the chewing process, specifically about 10 to about 15 seconds into the chewing process.

It has been found that a multilayered confectionery composition containing a candy layer and one or more gum layers provides a unique flavor transition not experienced with multilayered gum compositions free of the candy portion. It was particularly found that a duality of flavor experience can be achieved by providing a high level of flavor or cooling agents in the gum layer, and a lower level of flavor and food acid in the candy layer. Furthermore, the duality of flavor experience is provided with a candy layer having high levels of flavor and/or food acid and the gum layer having lower amounts of flavor.

In one embodiment, a multilayered confectionery composition containing a candy layer and one or more gum layers provides a sequential release of flavor by incorporating higher levels of isobutyleneisoprene copolymer (butyl rubber) as the elastomer portion of the chewing gum in comparison to traditional chewing gum. Within this embodiment, the chewing gum comprises greater than or equal to 5% w/w based on the weight of a gum base, specifically about 5 to about 15% w/w, and more specifically about 7 to about 10% w/w. The greater level of isobutyleneisoprene copolymer, the greater the delay in release of the chewing gum flavor thereby enhancing the consumer's perception of a sequential flavor release.

In one embodiment, a multilayered confectionery comprises a sugar-free candy layer having a high level of food acid and a chewing gum layer comprising a high level of cooling agents where the amounts of food acid and cooling agent provides an enhanced flavor effect. When fruit flavors are used in either the sugar-free candy or the chewing gum, the multilayered confectionery provides a fruit flavor that is richer, more natural and true to the fruit flavor without the need to have high levels of food acid in both the candy and chewing gum. Within this embodiment, the chewing gum comprises about 0.1 to about 0.5% w/w cooling agent by weight of the chewing gum, specifically about 0.2 to about 0.4, and yet more specifically about 0.25 to about 0.3% w/w. Also within this embodiment, the sugar-free candy comprises about 1.0 to about 3.75% w/w food acid by weight of the candy portion, specifically about 1.5 to about 3.5, and yet more specifically about 2.0 to about 2.75% w/w. Within this embodiment, the sugar-free candy layer comprises a composition comprising a base portion comprising mannitol and hydrogenated starch hydrolysate syrup, optionally a fondant portion comprising mannitol and hydrogenated starch hydrolysate syrup, a texturizing agent, a fat, a softener, and a flavor. Also within this embodiment, the level of flavor excluding cooling agents in the chewing gum portion is kept low since the enhanced effect on overall flavor provided by high level of food acid in the candy and high level of cooling agent in the chewing gum was reduced when the chewing gum flavor level was above 2.5% w/w by weight of the chewing gum.

In one embodiment, a multilayered confectionery comprises a sugar-free candy layer having a high level of flavor and a chewing gum layer comprising a low level of flavor, wherein the confectionery provides a balanced upfront and long lasting flavor profile. The term flavor within this embodiment excludes cooling agent. Within this embodiment, the chewing gum comprises about 1.5 to about 2.2% w/w flavor by weight of the chewing gum, specifically about 1.6 to about 2.0, and yet more specifically about 1.8 to about 1.9% w/w. Also within this embodiment, the sugar-free candy comprises about 1.5 to about 3.0% w/w flavor by weight of the candy portion, specifically about 1.8 to about 2.8, and yet more specifically about 2.0 to about 2.5% w/w. Due to the highly soluble nature of the candy, it was expected that lower levels of flavor would be needed in the candy and high levels of flavor in the chewing gum in order to get both an upfront burst of flavor and a long lasting flavor profile. However, it was observed that lower levels of flavor in the chewing gum and higher levels of flavor in the candy provided such a flavor profile. Within this embodiment, the sugar-free candy layer comprises a composition comprising a base portion comprising mannitol and hydrogenated starch hydrolysate syrup, optionally a fondant portion comprising mannitol and hydrogenated starch hydrolysate syrup, a texturizing agent, a fat, a food acid, a softener, and a flavor.

In one embodiment, a multilayered confectionery comprises a sugar-free candy layer having a high level of food acid and high level of flavor and a chewing gum layer comprising a high level of cooling agents and a low level of flavor. The term flavor within this embodiment excludes cooling agent. Within this embodiment, the chewing gum comprises about 0.1 to about 0.5% w/w cooling agent by weight of the chewing gum, specifically about 0.2 to about 0.4, and yet more specifically about 0.25 to about 0.3% w/w; and further wherein the chewing gum comprises about 1.5 to about 2.2% w/w flavor excluding cooling agent by weight of the chewing gum, specifically about 1.6 to about 2.0, and yet more specifically about 1.8 to about 1.9% w/w. Also within this embodiment, the sugar-free candy comprises about 1.0 to about 3.75% w/w food acid by weight of the candy portion, specifically about 1.5 to about 3.5, and yet more specifically about 2.0 to about 2.75% w/w; and further comprises about 1.5 to about 3.0% w/w flavor by weight of the candy portion, specifically about 1.8 to about 2.8, and yet more specifically about 2.0 to about 2.5% w/w. Within this embodiment, the sugar-free candy layer comprises a composition comprising a base portion comprising mannitol and hydrogenated starch hydrolysate syrup, optionally a fondant portion comprising mannitol and hydrogenated starch hydrolysate syrup, a texturizing agent, a fat, a softener, and a flavor.

In one embodiment, a multilayered confectionery comprises a sugar-free candy layer and a chewing gum layer, wherein the confectionery provides a longer lasting taste profile as compared to a similar confectionery containing only the chewing gum or only the sugar-free candy layer. Within this embodiment, the sugar-free candy layer comprises a composition comprising a base portion comprising mannitol and hydrogenated starch hydrolysate syrup, optionally a fondant portion comprising mannitol and hydrogenated starch hydrolysate syrup, a texturizing agent, a fat, a food acid, a softener, and a flavor. It was expected that the candy layer would provide an upfront taste burst due to its highly soluble property. Rather than the upfront taste dissipating quickly, unexpectedly a longer lasting taste was experienced.

The candy layer and the gum layer of the multilayered confectionery can each contain a color to accentuate the different layers of candy and gum. A contrast of a dark color for the candy and a lighter color for the gum layer allows for the distinct visual appearance of each layer. Alternatively, the candy can be prepared in a lighter color than the gum layer.

In one embodiment where the multilayered compositions provide visually distinct portions of the confectionery component and the chewing gum component, the visually distinction is made by a color difference, or the use of a glitter, pearlescent pigments, and the like. The color, glitter, or pearlescent pigment can be used in the confectionery component, the chewing gum component, or both.

In one embodiment, a multilayered confectionery comprises a sugar-free candy layer comprising an amount of texturizing agent such as gelatin and a chewing gum layer, wherein the multilayered confectionery provides a bouncier chew as compared to a similar confectionery containing a sugar-free candy layer free of the texturizing agent. Within this embodiment, the sugar-free candy layer comprises a composition comprising a base portion comprising mannitol and hydrogenated starch hydrolysate syrup, optionally a fondant portion comprising mannitol and hydrogenated starch hydrolysate syrup, a texturizing agent, a fat, a food acid, a softener, and a flavor. The presence of the texturizing agent in the sugar-free candy layer has been found to contribute to a bouncier chew to the resulting chewing gum when the multilayered confectionery is consumed.

The features and advantages are more fully shown by the following examples which are provided for purposes of illustration, and are not to be construed as limiting the invention in any way.

EXAMPLES

Example 1

Sugar-Free Confectionery: Chewy (A-D), Crunchy (E-F)

TABLE 1

| | Component | | | | | |
|---|---|---|---|---|---|---|
| | A | B | C | D | E | F |
| | % by weight | | | | | |
| PreCook | | | | | | |
| Candy Base | 75-81 | 74-80 | 70-85 | 70-85 | 72-84 | 70-85 |
| Isomalt GS | (38-42$^a$) | (38-42$^a$) | — | — | (60-70$^a$) | — |
| Mannitol | — | — | (15-25$^a$) | (15-25$^a$) | — | (75-85$^a$) |

TABLE 1-continued

|  | Component | | | | | |
|---|---|---|---|---|---|---|
|  | A | B | C | D | E | F |
|  | % by weight | | | | | |
| Lycasin ® | (58-62[a]) | (58-62[a]) | (75-85[a]) | (75-85[a]) | (30-40[a]) | (15-25[a]) |
| Water | (3.5-4.5[b]) | (2-3[b]) | (3-6[b]) | (3-6[b]) | (3-6[b]) | (3-6[b]) |
| Color Solution | | | | | | |
| FD&C color | 0-0.05 | 0-0.05 | 0-0.05 | 0-0.05 | 0-0.05 | 0-0.05 |
| Water | 0-0.2 | 0-0.2 | 0-0.2 | 0-0.2 | 0-0.2 | 0-0.2 |
| Post Cook Fat/Lecithin | | | | | | |
| Hydrogenated Coconut Oil | 3.8-4.2 | 3.8-4.2 | 3.5-4.5 | 3.5-4.5 | 3.5-4.5 | 3.5-4.5 |
| Lecithin | 0.03-0.07 | 0.03-0.07 | 0-0.1 | 0-0.1 | 0-0.1 | 0-0.1 |
| (Distilled) Glycerol Monostearate | 0.1-0.5 | 0.1-0.5 | 0-0.5 | 0-0.5 | 0-0.5 | 0-0.5 |
| Flavor | 0.5-3 | 0.5-3 | 1-3 | 1-3 | 1-3 | 1-3 |
| Acid | | | | | | |
| Malic acid | 1.0-1.4 | 1.0-1.4 | 0-4 | 0-4 | 0-4 | 0-4 |
| Citric acid | 2.1-2.5 | 2.1-2.5 | 0-4 | 0-4 | 0-4 | 0-4 |
| Sodium citrate dihydrate granular | 0-0.5 | 0-0.5 | 0-0.5 | 0-0.5 | 0-0.5 | 0-0.5 |
| Gelatin Solution | | | | | | |
| Gelatine 125 Bloom | 1.25-1.75 | 2.1-3.1 | — | — | — | — |
| Gelatine 250 Bloom | — | — | 0-3 | 0-3 | — | — |
| Water | 1.75-2.75 | 3.5-4.5 | 3.5-4.5 | 3.5-4.5 | — | — |
| Fondant | | | | | | |
| Isomalt (ST-PF) | 2.5-4.0 | 2.5-4.0 | — | — | 2.5-4.0 | — |
| Mannitol | — | — | 1.0-4.0 | — | — | 1.0-4.0 |
| Lycasin ® | 1-1.5 | 1-1.5 | 0-1.5 | — | 1-1.5 | 0-1.5 |
| Water | 0.2-0.6 | 0.2-0.6 | 0.2-0.6 | — | 0.2-0.6 | 0.2-0.6 |
| Total | 100.0 | 100.0 | 100.0 | 100.0 | 100.0 | 100.0 |

[a]dry percent weight of candy base
[b]moisture content after cook

The candy base is prepared by combining the candy base ingredients and color solution and cooking to about 135° C. (about 137° C. for crunchy formulations E and F) in a kettle. A 20" vacuum is pulled on the cooked mixture that is then transferred to another mixing bowl within about three minutes. Fat, lecithin, glycerol monostearate, and pre-soaked gelatin is added once the temperature of the cooked mixture reaches below 100° C. and mixing continues for about ten minutes. The acid blend is then added with an additional five minutes of mixing. The flavor is added and mixed for about five minutes. The resulting mixture is dropped to a cooling table and allowed to cool to about 45-50° C. Separately, a fondant is prepared by intensely mixing the fondant polyols with water. The fondant is added to the cooled mixture and the entire mass is pulled to a desired consistency: about ten minutes for a chewy candy and about four minutes for a crunchy candy. The tempered material is allowed to stand at about 34-36° C. for at least eight hours.

Example 2

Sugar-Based and Sugar-Free Chewing Gum Compositions

TABLE 2

|  | % by weight | | | | |
|---|---|---|---|---|---|
| Component | A | B | C | D | E |
| Gum Base* | 30-40 | 32-42 | 20-40 | 18-25 | 35-38 |
| Lecithin | 0.25-0.75 | 0.25-0.75 | 0.25-0.75 | 0.25-1.0 | — |
| Acetylated monoglycrides | 0 | 0.50-0.60 | — | — | — |
| Glycerin | 0 | 2.0-3.5 | 2.0-3.5 | 1.0-3.5 | 0-0.5 |
| talc | 0-5.0 | 0 | — | — | — |
| Lycasin ® 80/55 | 0-2.0 | 0 | — | — | — |
| Maltitol (ROQUETTE, P35SK) | 35.0-45.0 | 35.0-45.0 | — | — | — |
| Sorbitol Powder NF/FCC ROQUETTE, P60W | 5.0-15.0 | 5.0-15.0 | — | — | — |
| Sucrose (sugar) | — | — | 55-65 | 58-65 | 50-56 |
| Corn syrup | — | — | 5.0-15 | 13.-20 | 7.0-10 |
| Flavor | 0.5-4.0 | 0.5-4.0 | 0.5-4.0 | 0.5-2.0 | 0.5-2.0 |

TABLE 2-continued

| Component | % by weight | | | | |
|---|---|---|---|---|---|
| | A | B | C | D | E |
| Acid | 0-2.0 | 0-2.0 | 0-2.0 | 0-2.0 | 0-2.0 |
| Color | 0-0.5 | 0-0.5 | 0-0.5 | 0-0.5 | 0-0.5 |
| High intensity Sweetener | 0.1-5.0 | 0.1-5.0 | 0-5.0 | 0-2.0 | — |
| Total | 100 | 100 | 100 | 100 | 100 |

*gum base may include a filler such as, for example talc, dicalcium phosphate, and calcium carbonate Formulation A is prepared by melting base at a temperature of about 90° C. Once melted, lecithin, talc and lycasin is added to the base with mixing. The sugar polyols are then added and mixed for three minutes. Flavor, acid and color are added and mixed for about three minutes. Once the temperature of the mixture drops to 48° C. or less, additional flavor and high intensity sweeteners are added with mixing for about three minutes.

Formulation B is prepared by mixing half the amount of maltitol with the sorbitol and color in a standard mixer. Gum base heated to about 88° C. (kettle temperature about 90° C.) is added along with the lecithin and acetylated monoglycerides and mixed for about four minutes. Glycerin, flavor and remaining maltitol is added and mixed for about three minutes. Once the temperature of the mixture drops to 48° C. or less, acid, additional flavor and high intensity sweeteners are added with mixing for about three minutes.

Formulations C-D are prepared by melting the base at a temperature of about 90° C. Once melted, the softener(s) are added to the base with mixing. The sugar and corn syrup are then added and mixed followed by the addition of the remaining ingredients to form a homogenous mixture.

The above mixing times are approximate and the mixture can be mixed longer as necessary.

Example 3

Candy-Gum Composition, Laminate

A multilayered laminate of a sugar-free confectionery layer and a chewing gum layer is prepared by a coextrusion process or a laminate process. In the coextrusion process, a chewing gum formulation of Example 2 is loaded into a first hopper and optionally a third hopper, and a confectionery composition of Example 1 is loaded into a second hopper. The confectionery and chewing gum are coextruded to form a bilayer or trilayer composite containing about 30% w/w sugar-free confectionery and about 70% w/w chewing gum. The resulting layered structure is formed into the desired final shape employing conventional techniques, e.g., cut into sticks or other shapes and optionally further packaged.

Example 4

Sugar-Free Confectionery: Chewy, Mannitol Fondant

Several chewy candy formulations were prepared with a mannitol fondant to explore the parameters contributing to a chewy candy having good body (low ooze when prepared into multilayered format with sugar-free chewing gum layers) and good chewiness. The formulations explored are provided in Tables 3 and 4. The chewy candy was prepared by weighing and mixing the mannitol and Lycasin® of the candy base portion, followed by the addition of oil, glycerol monostearate, and lecithin with mixing and transferred to a pre-cooker set at a temperature of about 100° C. A mixture of water and colorant is added and the resulting mixture is cooked to a temperature indicated in the Tables (about 126 to about 145° C.) with a vacuum pulled on the cooked mixture of about 3 inches Hg. Once the target cook temperature is achieved, the candy mass is discharged and mixed with a gelatin mixture. The acid blend/sodium citrate is then added with additional mixing. The flavor is then added with mixing. The resulting mixture is dropped to a cooling table and allowed to cool to about 45-50° C. An amount of fondant is added to the cooled mixture and the entire mass is pulled for a time as indicated in the tables.

The fondant used in the formulations was prepared a day in advance by cooking a solution of 26.5% w/w (37% dry) mannitol, 13.3% w/w water, and 60.2% w/w (63% dry) Lycasin to 104.5° C. The fondant was stored at room temperature prior to use.

The sugar-free chewy confectioneries of Tables 3 and 4 were analyzed for density, water activity, viscosity, moisture/pH, and texture.

Density was measured for the chewy candy material using a large graduated cylinder in which a known weight of candy was quickly submerged in water and the volume change was recorded.

Water activity was measured for the chewy candy material with a water activity meter.

Viscosity was measured for the chewy candy material by the height difference of a candy sample after one hour. A known weight of candy was filled into a measuring cup and turned upside down on a tray. The candy height is measured after one hour.

Moisture for the chewy candy material was determined by the Karl Fischer method.

Each chewy candy formulation was processed into a three layer laminate with chewing gum formula as provided in Table 2A of Example 2. A trilayer composite was formed by coextrusion containing about 25% w/w center chewy candy layer, and about 75% w/w chewing gum in the form of two outer layers "sandwiching" the chewy candy layer. Both the chewy candy and the chewing gum are independently passed through their own separate preextruders prior to feeding into a main extruder for coextrusion. Processing parameters for the extruders are provided in the table below:

| | |
|---|---|
| Chewing gum pre-extruder nozzle temperature | 44-50° C. |
| Chewing gum pre-extruder barrel temperature | 38-42° C. |
| Chewing gum pre-extruder amps | 12-14 amps |
| Chewing gum pre-extruder speed | 2-4 rpm |
| Chewing gum pre-cooling condition | 19-21° C. |
| Main extruder nozzle temperature | 43-47° C. |
| Main extruder barrel temperature | 43-47° C. |
| Main extruder amps | 2.5 amps |
| Main extruder speed | 3.5-4.5 rpm |

| | |
|---|---|
| Candy extruder nozzle temperature | 33-37° C. |
| Candy extruder barrel temperature | 33-37° C. |
| Candy extruder amps | 3-4 amps |
| Candy extruder speed | 11.5-13.5 rpm |

The chewy candy layer of each laminate was analyzed for texture and ooze/crunchiness. Texture was measured using a texture analyzer (Stable Micro System Texture Analyzer, Plus Upgrade; Plunger: 4 mm cylinder; Approach speed. 1 mm/sec; Penetration distance: 4.3 mm; Sample preparation: sample conditioned at 25° C. for at least four hours). A sample piece of the three layer laminate measuring 35 mm long×5.5 mm thickness×12.5 mm width is placed under the probe with the sample resting along its length and width. The probe is gradually lowered and applies compressive force parallel to its thickness and perpendicular to the face measuring 35 mm long×12.5 mm wide. Force is measured as a function of time until the probe penetrates the sample by 3 mm. The measurements are performed at room temperature (about 21° C.) upon a 25° C. conditioned sample and the results are provided in grams. The time from production of the chewy candy to testing is indicated in the tables.

Ooze/crunchiness was measured by two individuals after production and over time. The product at room temperature (about 21° C.) was measured for sensory parameters based on a scale of 1 to 5, where 1 is good/desirable and 5 was bad/unacceptable. For ooze, 1=very good, 5=very bad oozing. For crunchiness, 1=very soft, 5=very crunchy or hard. The time from production of the chewy candy to testing is indicated in the tables.

TABLE 3

| Component | 4-1 Cook 138 C. Pull time 6 minutes | 4-2 Cook 126 C. Pull time 10 minutes | 4-3 Cook 145 C. Pull time 4 minutes | 4-4 Cook 145 C. Pull time 0 minutes | 4-5 Cook 126 C. Pull time 10 minutes |
|---|---|---|---|---|---|
| | | | % by weight | | |
| PreCook | | | | | |
| Candy Base | 86.5 | 93.0 | 85.0 | 89.3 | 81.6 |
| Mannitol | 9.5 | 20.5 | 18.7 | — | — |
| Lycasin ® 80/55 HDS | 77.0 | 72.6 | 66.3 | 89.3 | 81.6 |
| Water | 4.1 | 8.0 | 8.0 | — | — |
| Color Solution | | | | | |
| FD&C color | 0-0.05 | 0-0.05 | 0-0.05 | 0-0.05 | 0-0.05 |
| Water | 0-0.2 | 0-0.2 | 0-0.2 | 0-0.2 | 0-0.2 |
| Post Cook Fat/Lecithin | | | | | |
| Hydrogenated Coconut Oil or Palm Oil | 4.1 | 4.5 | 4.1 | 4.1 | 3.8 |
| Lecithin | 0.052 | 0.056 | 0.051 | 0.053 | 0.048 |
| (Distilled) Glycerol Monostearate | 0.31 | 0.33 | 0.31 | 0.31 | 0.29 |
| Flavor | 0.5-3.0 | 0.5-3.0 | 0.5-3.0 | 0.5-3.0 | 0.5-3.0 |
| Acid | | | | | |
| Malic acid | 0.8 | — | — | 1.6 | 1.6 |
| Citric acid | 1.2 | — | — | 2.4 | 2.4 |
| Sodium citrate | 0.65 | — | — | — | — |
| Gelatin Solution | | | | | |
| Gelatine 250 Bloom | 1.25 | 1.5 | 1.0 | 1.5 | 1.0 |
| Water | 1.85 | 1.85 | 1.85 | 1.85 | 1.85 |
| Fondant | | | | | |
| Mannitol | 2.14 | — | 4.2 | — | 4.0 |
| Lycasin ® 80/55 HDS | 2.4 | — | 4.74 | — | 4.5 |
| Water | 0.51 | — | 0.99 | — | 0.95 |
| Total | 100.0 | 100.0 | 100.0 | 100.0 | 100.0 |
| Properties | | | | | |
| Density (grams/centimeter$^3$, average) | 1.22-1.26 | 1.25 | 1.34 | 1.40 | 1.14 |
| Water Activity (at 20.4-21.0 C., average) | 0.38-0.40 | 0.38 | 0.39 | 0.35 | 0.41 |
| Viscosity (millimeter) | 43.4-50.4 | 74.9 | 72.5 | 30.0 | 11.9 |
| Moisture (%, average) | 5.07-5.43 | 6.55 | 6.52 | 3.71 | 7.44 |
| pH (Average) | 2.25-2.56 | 3.76 | 4.18 | 1.75 | 2.04 |
| Crunchy (after 4-6 days) | 3 | 1 | 2 | 5 | 1 |

TABLE 3-continued

| Component | 4-1 Cook 138 C. Pull time 6 minutes | 4-2 Cook 126 C. Pull time 10 minutes | 4-3 Cook 145 C. Pull time 4 minutes | 4-4 Cook 145 C. Pull time 0 minutes | 4-5 Cook 126 C. Pull time 10 minutes |
|---|---|---|---|---|---|
| | | | % by weight | | |
| Crunchy (after about 4 weeks) | 4 | 1 | 3 | 5 | 1 |
| Ooze (after 4-6 days) | 1 | 4 | 2 | 1 | 5 |
| Ooze (after about 4 weeks) | 1 | 4 | 2 | 1 | 5 |
| Texture by TA (grams) after 4-6 days | 4248-4307 | 3156 | 5519 | 7493 | 3361 |

[a] added water present in base

TABLE 4

| Component | 4-6 Cook 145 C. Pull time 10 minutes | 4-7 Cook 126 C. Pull time 0 minutes | 4-8 Cook 126 C. Pull time 4 minutes | 4-9 Cook 145 C. Pull time 10 minutes | 4-10 Cook 138 C. Pull time 10 minutes |
|---|---|---|---|---|---|
| | | | % by weight | | |
| PreCook | | | | | |
| Candy Base | 80.0 | 88.5 | 82.7 | 91.4 | 82.5 |
| Mannitol | 17.6 | 19.5 | — | — | 9.1 |
| Lycasin ® 80/55 HDS | 62.4 | 69.0 | 82.7 | 91.4 | 73.5 |
| Water[a] | 8.0 | 8.0 | — | — | 4.1 |
| Color Solution | | | | | |
| FD&C color | 0-0.05 | 0-0.05 | 0-0.05 | 0-0.05 | 0-0.05 |
| Water | 0-0.2 | 0-0.2 | 0-0.2 | 0-0.2 | 0-0.2 |
| Post Cook | | | | | |
| Fat/Lecithin | | | | | |
| Hydrogenated Coconut Oil or Palm Oil | 3.8 | 4.2 | 3.9 | 4.3 | 3.9 |
| Lecithin | 0.048 | 0.054 | 0.049 | 0.054 | 0.049 |
| (Distilled) Glycerol Monostearate | 0.29 | 0.32 | 0.29 | 0.32 | 0.29 |
| Flavor | 0.5-3.0 | 0.5-3.0 | 0.5-3.0 | 0.5-3.0 | 0.5-3.0 |
| Acid | | | | | |
| Malic acid | 1.6 | 1.6 | 0.4 | 0.4 | 0.8 |
| Citric acid | 2.4 | 2.4 | 0.6 | 0.6 | 1.2 |
| Sodium citrate | 1.3 | 1.3 | 1.3 | 1.3 | 0.65 |
| Gelatin Solution | | | | | |
| Gelatine 250 Bloom | 1.5 | 1.0 | 1.5 | 1.0 | 1.25 |
| Water | 1.85 | 1.85 | 1.85 | 1.85 | 1.85 |
| Fondant | | | | | |
| Mannitol | 4.0 | — | 4.01 | — | 4.08 |
| Lycasin ® 80/55 HDS | 4.5 | — | 4.6 | — | 4.6 |
| Water | 0.94 | — | 0.97 | — | 0.96 |
| Total | 100.0 | 100.0 | 100.0 | 100.0 | 100.0 |
| Properties | | | | | |
| Density (grams/centimeter$^3$, average) | 1.33 | 1.39 | 1.27 | 1.20 | 1.14 |
| Water Activity (at 20.4-21.0 C., average) | 0.40 | 0.42 | 0.43 | 0.38 | 0.37 |
| Viscosity (millimeter) | 68.2 | 7.4 | 8.5 | 31.3 | 14.4 |
| Moisture (%, average) | 5.55 | 6.71 | 7.96 | 4.31 | 6.29 |

TABLE 4-continued

| Component | 4-6 Cook 145 C. Pull time 10 minutes | 4-7 Cook 126 C. Pull time 0 minutes | 4-8 Cook 126 C. Pull time 4 minutes | 4-9 Cook 145 C. Pull time 10 minutes | 4-10 Cook 138 C. Pull time 10 minutes |
|---|---|---|---|---|---|
| | | | % by weight | | |
| pH (Average) | 2.01 | 1.95 | 3.02 | 3.01 | 2.59 |
| Crunchy (after 4-6 days) | 3 | 1 | 1 | 4 | 3 |
| Crunchy (after about 4 weeks) | 2 | 1 | 1 | 4 | 3 |
| Ooze (after 4-6 days) | 4 | 5 | 5 | 1 | 3 |
| Ooze (after about 4 weeks) | 4 | 5 | 5 | 1 | 3 |
| Texture by TA (grams) after 4-6 days | 3969 | 4801 | 3125 | 4832 | 3808 |

[a] added water present in base

Formulations 4-4 and 4-9 which contained no mannitol and prepared using a high cook temperature could not be fully processed as the candy was too hard for the cutting equipment.

Analysis of the formulations reveal that cook temperature, mannitol level, and gelatin level contributes the most to whether a chewy candy with low ooze and good body is achieved versus a crunchy candy or a candy without sufficient body to minimize ooze from the final product.

Increasing the cook temperature results in decreasing moisture content and an increasingly crunchy product with reduced ooze. Decreasing the cook temperature results in increasing amounts of moisture, a more chewy candy and an increase in the likelihood of ooze.

Increasing the mannitol level both contributed to good chewiness and a reduction in ooze. Too high a mannitol level made pulling difficult and at about 24% mannitol, rapid graining occurred before pulling when low energy mixers were used. Use of higher energy mixers (e.g., sigma mixer) may allow for more mannitol to be used.

Increasing the gelatin level was found to have a positive effect on reducing ooze of the product.

It was observed that the initial storage temperature of the final layered product significantly influenced the candy layer's crunchiness over time. Products stored in warmer temperatures (about 25° C.) maintained their softness while products stored at lower temperatures (19-21° C.) became crunchier. Not wishing to be bound by theory, it is believed maintaining the product above the glass transition temperature of the candy allows for graining of the product, whereas maintaining the product below the glass transition temperature resulted in a more hard and glassy product. Lowering the glass transition temperature of the candy for convenience of storage can be achieved by increasing the moisture of the candy (lowering the cook temperature) and decreasing the molecular weight of the polyols (e.g., by increasing the mannitol:Lycasin ratio).

Example 5

Sugar-Free Confectionery: Chewy, Mannitol Fondant

Several chewy candy formulations were prepared with a mannitol fondant to explore the parameters responsible to make a chewy candy having good body (low ooze when prepared into multilayered format with sugar-free chewing gum layers) and good chewiness. The formulations explored are provided in Tables 5 and 6. The chewy candy was prepared by a process similar to Example 4 with a pull time of 10 minutes (2 minutes slow and 8 minutes fast).

The fondant used in the formulations was similar to the fondant used in Example 4.

The sugar-free chewy confectioneries of Tables 5 and 6 were analyzed for density, water activity, viscosity, moisture, pH, crunchiness/ooze on a 1-5 scale and texture by texture analyzer analysis as previously described.

Each chewy candy formulation was processed into a three layer laminate with chewing gum formula as provided in Table 2A of Example 2. A trilayer composite was formed by coextrusion containing about 25% w/w center chewy candy layer, and about 75% w/w chewing gum in the form of two outer layers "sandwiching" the chewy candy layer. The chewy candy layer of each laminate was analyzed for ooze/crunchiness.

TABLE 5

| | Component | | | | | |
|---|---|---|---|---|---|---|
| | 5-1 Cook 132 C. | 5-2 Cook 128 C. | 5-3 Cook 136 C. | 5-4 Cook 132 C. | 5-5 Cook 132 C. | 5-6 Cook 132 C. |
| | % by weight | | | | | |
| PreCook | | | | | | |
| Candy Base | 86.8 | 86.7 | 86.8 | 87.3 | 86.9 | 86.6 |
| Mannitol | 10.4 | 13.9 | 6.9 | 10.5 | 5.2 | 10.4 |
| Lycasin ® 80/55 HDS | 76.4 | 72.8 | 79.8 | 76.8 | 81.7 | 76.2 |
| Water[a] | 4.4 | 5.9 | 3.0 | 4.4 | 2.2 | 4.4 |

TABLE 5-continued

| | Component | | | | | |
|---|---|---|---|---|---|---|
| | 5-1 Cook 132 C. | 5-2 Cook 128 C. | 5-3 Cook 136 C. | 5-4 Cook 132 C. | 5-5 Cook 132 C. | 5-6 Cook 132 C. |
| | % by weight | | | | | |
| Color Solution | | | | | | |
| FD&C color | 0-0.05 | 0-0.05 | 0-0.05 | 0-0.05 | 0-0.05 | 0-0.05 |
| Water | 0-0.2 | 0-0.2 | 0-0.2 | 0-0.2 | 0-0.2 | 0-0.2 |
| Post Cook Fat/Lecithin | | | | | | |
| Hydrogenated Coconut Oil or Palm Oil | 4.1 | 4.1 | 4.1 | 4.1 | 4.1 | 4.1 |
| Lecithin | 0.052 | 0.052 | 0.052 | 0.052 | 0.052 | 0.052 |
| (Distilled) Glycerol Monostearate | 0.31 | 0.31 | 0.31 | 0.31 | 0.31 | 0.31 |
| Flavor | 0.5-3.0 | 0.5-3.0 | 0.5-3.0 | 0.5-3.0 | 0.5-3.0 | 0.5-3.0 |
| Acid | | | | | | |
| Malic acid | 0.8 | 0.8 | 0.8 | 0.8 | 0.8 | 0.8 |
| Citric acid | 1.2 | 1.2 | 1.2 | 1.2 | 1.2 | 1.2 |
| Gelatin Solution | | | | | | |
| Gelatine 250 Bloom | 1.5 | 1.6 | 1.6 | 1.0 | 1.5 | 1.75 |
| Water | 2.2 | 2.2 | 2.2 | 2.2 | 2.2 | 2.2 |
| Fondant | | | | | | |
| Mannitol | 2.15 | 2.14 | 2.14 | 2.16 | 2.15 | 2.14 |
| Lycasin ® 80/55 HDS | 2.4 | 2.4 | 2.4 | 2.4 | 2.4 | 2.4 |
| Water | 0.51 | 0.51 | 0.51 | 0.51 | 0.51 | 0.51 |
| Total | 100.0 | 100.0 | 100.0 | 100.0 | 100.0 | 100.0 |
| Properties | | | | | | |
| Density (grams/centimeter$^3$, average) | 1.21 | 1.17 | 1.09 | 1.24 | 1.25 | 1.27 |
| Water Activity (at 20.4-21.0 C., average) | 0.41 | 0.46 | 0.39 | 0.41 | 0.41 | 0.42 |
| Viscosity (millimeter) | 27.5-33.2 | 47.8 | 21.4 | 32.6 | — | 34.0 |
| Moisture (%, average) | 6.60-6.83 | 7.90 | 7.37 | 6.67 | 6.65 | 6.52 |
| pH (Average) | 2.19-2.25 | 2.19 | 2.08 | 2.41 | 2.29 | 2.27 |
| Crunchy (after 4-6 days) | 2 | 1 | 2.5 | 1 | 3 | 2.5 |
| Crunchy (after about 4 weeks) | 1 | 1 | 2 | 1 | 2 | 2 |
| Ooze (after 4-6 days) | 3 | 3 | 3 | 3 | 4 | 4 |
| Ooze (after about 4 weeks) | 3-3.5 | 3 | 3 | 3.5 | 4 | 3.5 |
| Texture by TA (grams) after 12-14 days | 3177-3518 | 3108 | 4253 | 3632 | 3819 | 3686 |

$^a$added water present in base

TABLE 6

| | Component | | | | | |
|---|---|---|---|---|---|---|
| | 5-7 Cook 128 C. | 5-8 Cook 126 C. | 5-9 Cook 136 C. | 5-10 Cook 138 C. | 5-11 Cook 132 C. | 5-12 Cook 132 C. |
| | % by weight | | | | | |
| PreCook | | | | | | |
| Candy Base | 86.8 | 86.3 | 86.7 | 86.8 | 86.8 | 86.8 |
| Mannitol | 6.9 | 10.4 | 13.9 | 10.4 | 15.6 | 10.4 |
| Lycasin ® 80/55 HDS | 79.8 | 76.4 | 72.8 | 76.4 | 71.2 | 76.4 |
| Water$^a$ | 3.0 | 4.4 | 5.9 | 4.4 | 6.6 | 4.4 |

TABLE 6-continued

| | Component | | | | | |
|---|---|---|---|---|---|---|
| | 5-7 Cook 128 C. | 5-8 Cook 126 C. | 5-9 Cook 136 C. | 5-10 Cook 138 C. | 5-11 Cook 132 C. | 5-12 Cook 132 C. |
| | % by weight | | | | | |
| Color Solution | | | | | | |
| FD&C color | 0-0.05 | 0-0.05 | 0-0.05 | 0-0.05 | 0-0.05 | 0-0.05 |
| Water | 0-0.2 | 0-0.2 | 0-0.2 | 0-0.2 | 0-0.2 | 0-0.2 |
| Post Cook Fat/Lecithin | | | | | | |
| Hydrogenated Coconut Oil or Palm Oil | 4.1 | 4.1 | 4.1 | 4.1 | 4.1 | 4.1 |
| Lecithin | 0.052 | 0.052 | 0.052 | 0.052 | 0.052 | 0.052 |
| (Distilled) Glycerol Monostearate | 0.31 | 0.31 | 0.31 | 0.31 | 0.31 | 0.31 |
| Flavor | 0.5-3.0 | 0.5-3.0 | 0.5-3.0 | 0.5-3.0 | 0.5-3.0 | 0.5-3.0 |
| Acid | | | | | | |
| Malic acid | 0.8 | 0.8 | 0.8 | 0.8 | 0.8 | 0.8 |
| Citric acid | 1.2 | 1.2 | 1.2 | 1.2 | 1.2 | 1.2 |
| Gelatin Solution | | | | | | |
| Gelatine 250 Bloom | 1.6 | 1.5 | 1.6 | 1.5 | 1.5 | 1.5 |
| Water | 2.2 | 2.2 | 2.2 | 2.2 | 2.2 | 2.2 |
| Fondant | | | | | | |
| Mannitol | 2.14 | 2.15 | 2.14 | 2.15 | 2.15 | 2.15 |
| Lycasin ® 80/55 HDS | 2.4 | 2.4 | 2.4 | 2.4 | 2.4 | 2.4 |
| Water | 0.51 | 0.51 | 0.51 | 0.51 | 0.51 | 0.51 |
| Total | 100.0 | 100.0 | 100.0 | 100.0 | 100.0 | 100.0 |
| Properties | | | | | | |
| Density (grams/centimeter$^3$, average) | 1.10 | 1.16 | 1.22 | 1.18 | 1.15 | 1.21 |
| Water Activity (at 20.4-21.0 C., average) | 0.41 | 0.40 | 0.43 | 0.40 | 0.41 | 0.43 |
| Viscosity (millimeter) | 17.8 | 35.9 | 48.1 | 26.9 | 52.2 | 26.9 |
| Moisture (%, average) | 8.29 | 7.48 | 6.77 | 6.93 | 6.54 | 7.25 |
| pH (Average) | 2.04 | 2.23 | 2.16 | 2.28 | 2.21 | 2.29 |
| Crunchy (after 4-6 days) | 1 | 1 | 2 | 2 | 1 | 2.5 |
| Crunchy (after about 4 weeks) | 1 | 1 | 1 | 2.5 | 1 | 3 |
| Ooze (after 4-6 days) | 3.5 | 4 | 2 | 2 | 2.5 | 2.5 |
| Ooze (after about 4 weeks) | 3.5 | 4 | 2 | 2 | 2.5 | 2.5 |
| Texture by TA (grams) after 12-14 days | 4212 | 3015 | 3763 | 4080 | 3464 | 3976 |

$^a$added water present in base

The results of the analysis revealed that increasing the mannitol level both contributed to good chewiness and a reduction in ooze. Too high a mannitol level made pulling difficult and rapid graining occurred using low energy mixers and a pulling process.

Also it was found that increasing the cook temperature results in decreasing moisture content and an increasingly crunchy product with reduced ooze. Decreasing the cook temperature results in increasing amounts of moisture, a more chewy candy and an increase in the likelihood of ooze.

It was also determined that a pull time of about 10 minutes provided a candy composition with good body.

As with the products of Example 4, it was found that the storage temperature affected the crunchiness of the product, where storage of the product above the glass transition temperature of the candy allowed for graining leading to a material having a soft and chewy texture.

Example 6

Sugar-Free Chewy Confectionery: Mannitol Fondant

Several chewy candy formulations were prepared with various mannitol fondants to explore the effect of fondant type and amount on the chewy candy properties. The candy and fondant formulations explored are provided in Tables 7-9. The chewy candy was prepared using a process similar to Example 4 with a pull time of 10 minutes (2 minutes slow and 8 minutes fast).

The fondant used in formulation 6-1 of Table 7 was similar to the fondant used in Example 4. Formulations 6-2 to 6-15 of Table 9 contained a similar formulation as 6-1 except the fondant used are the formulations in Table 8. The fondant formulation of Table 8 were prepared using a Kajiwara oblique axis cooking mixer for high intensity mixing. These fondants were prepared by adding Lycasin, and sorbitol syrup if used, to a cooker followed by the mannitol and water. The mixture is cooked to about 120° C. with mixing at moderate speed (about 30 rpm). The mixing speed is increased to about 90 rpm and 35-40° C. water is injected into the cooker jacket while mixing continues until the fondant cools below 50-55° C.

Several batches of fondant F6 were prepared and analyzed by laser light analysis using a Shimadzu SALD-2101 particle size analyzer. The batches exhibited a median particle size of about 29-33 micrometers.

TABLE 7

| Component | 6-1 Cook 132 C. % by weight |
|---|---|
| PreCook | |
| Candy Base | 87.0 |
| Mannitol | 10.4 |
| Lycasin ® 80/55 HDS | 76.6 |
| Water[a] | 4.4 |
| Color Solution | |
| FD&C color | 0-0.05 |
| Water | 0-0.2 |
| Post Cook | |
| Fat/Lecithin | |
| Hydrogenated Coconut Oil or Palm Oil | 4.1 |
| Lecithin | 0.052 |
| (Distilled) Glycerol Monostearate | 0.31 |
| Flavor | 0.5-3.0 |
| Acid | |
| Malic acid | 0.8 |
| Citric acid | 1.2 |
| Gelatin Solution | |
| Gelatine 250 Bloom | 1.3 |
| Water | 1.9 |
| Fondant | |
| Mannitol | 2.15 |
| Lycasin ® 80/55 HDS | 2.4 |
| Water | 0.51 |
| Total | 100.0 |

[a]added water present in base

TABLE 8

| Fondant F# | Wet wt (kg) | Solid content (%) | Dry wt (kg) | Solid ratio (%) | Net wt (%) |
|---|---|---|---|---|---|
| F1: 37% Mannitol | | | | | |
| Lycasin ® 80/55 HDS | 19.40 | 85.00 | 16.49 | 62.96 | 57.14 |
| Mannitol | 9.70 | 100.00 | 9.70 | 37.04 | 28.57 |
| Water | 4.85 | — | — | — | 14.29 |
| Total | 33.95 | | 26.19 | 100.00 | 100.00 |
| F2: 47% Mannitol | | | | | |
| Lycasin ® 80/55 HDS | 15.90 | 85.00 | 13.52 | 52.97 | 46.90 |
| Mannitol | 12.00 | 100.00 | 12.00 | 47.03 | 35.40 |
| Water | 6.00 | — | — | — | 17.70 |
| Total | 33.90 | | 25.52 | 100.00 | 100.00 |
| F3: 57% Mannitol | | | | | |
| Lycasin ® 80/55 HDS | 12.90 | 85.00 | 10.97 | 43.06 | 37.23 |
| Mannitol | 14.50 | 100.00 | 14.50 | 56.94 | 41.85 |
| Water | 7.25 | — | — | — | 20.92 |
| Total | 34.65 | | 25.47 | 100.00 | 100.00 |
| F4: 37% Mannitol w/sorbitol syrup | | | | | |
| Lycasin ® 80/55 HDS | 9.70 | 85.00 | 8.25 | 31.48 | 26.22 |
| Sorbitol syrup (Polyol ® 70/100 Roquette) | 11.78 | 70.00 | 8.25 | 31.48 | 31.84 |
| Mannitol | 9.70 | 100.00 | 9.70 | 37.04 | 26.22 |
| Water | 5.82 | — | — | — | 15.73 |
| Total | 37.00 | | 26.19 | 100.00 | 100.00 |
| F5: 47% Mannitol w/sorbitol syrup | | | | | |
| Lycasin ® 80/55 HDS | 7.95 | 85.00 | 6.76 | 26.49 | 21.60 |
| Sorbitol syrup (Polyol ® 70/100 Roquette) | 9.65 | 70.00 | 6.76 | 26.48 | 26.22 |
| Mannitol | 12.00 | 100.00 | 12.00 | 47.04 | 32.61 |
| Water | 7.20 | — | — | — | 19.57 |
| Total | 36.80 | | 25.51 | 100.00 | 100.00 |
| F6: 57% Mannitol w/sorbitol syrup | | | | | |
| Lycasin ® 80/55 HDS | 6.45 | 85.00 | 5.48 | 21.53 | 17.21 |
| Sorbitol syrup (Polyol ® 70/100 Roquette) | 7.83 | 70.00 | 5.48 | 21.52 | 20.89 |
| Mannitol | 14.50 | 100.00 | 14.50 | 56.94 | 38.69 |
| Water | 8.70 | — | — | — | 23.21 |
| Total | 37.48 | | 25.46 | 100.00 | 100.00 |

Each chewy candy formulation was processed into a three layer laminate with chewing gum formula as provided in Table 2A of Example 2. A trilayer composite was formed by coextrusion containing about 25% w/w center chewy candy layer, and about 75% w/w chewing gum in the form of two outer layers "sandwiching" the chewy candy layer. The chewy candy layer of each laminate was analyzed for ooze/crunchiness, moisture, pH, water activity, density, viscosity, and texture. The results of the analyses are provided in Table 9.

TABLE 9

| Formula | Fondant Amount (% w/w total candy formula) | Moisture (%, average) | pH (Average) | Water Activity (at 20.4-21.0 C., average) | Density (grams/centimeter$^3$, average) | Viscosity (millimeter) | Crunchy (after 4-6 days) | Ooze (after 4-6 days) | Texture by TA (grams) after 4-6 days | Texture by TA (grams) after about 8 weeks |
|---|---|---|---|---|---|---|---|---|---|---|
| 6-1 | A28 (5%) | 7.19 | 2.22 | 0.41 | 1.15 | — | 3 | 1.5 | 3585 | 4393 |
| 6-2 | F2 (5%) | 7.11 | 2.17 | 0.39 | 1.12 | — | 3 | 1.5 | 4279 | — |
| 6-3 | F2 (10%) | 7.15 | 2.15 | 0.41 | 1.18 | — | 3 | 2 | 4182 | — |
| 6-4 | F2 (15%) | 6.89 | 2.20 | 0.40 | 1.11 | — | 1 | 3 | 3861 | — |
| 6-5 | F1 (5%) | 7.10 | 2.25 | 0.37 | 1.09 | — | 3 | 1.5 | 4580 | — |
| 6-6 | F1 (10%) | 6.78 | 2.21 | 0.38 | 1.23 | — | 1 | 2 | 4141 | — |
| 6-7 | F1 (15%) | 6.90 | 2.12 | 0.43 | 1.15 | — | 1 | 3.5 | 4094 | — |
| 6-8 | F6 (5%) | 6.22 | 2.37 | 0.41 | 1.15 | 37.5 | 2.5 | 1.5 | 3839 | 4258 |
| 6-9 | F6 (10%) | 6.18 | 2.23 | 0.39 | 1.20 | 29.0 | 1 | 1.5 | 3208 | 4118 |
| 6-10 | F6 (15%) | 6.27 | 2.20 | 0.38 | 1.19 | 22.1 | 1 | 2 | 3165 | 3984 |
| 6-11 | F4 (5%) | 6.16 | 2.25 | 0.38 | 1.20 | 34.5 | 2.5 | 1.5 | 3716 | 4352 |
| 6-12 | F4 (10%) | 6.29 | 2.30 | 0.39 | 1.24 | 26.1 | 1 | 2.5 | 3351 | 4107 |
| 6-13 | F4 (15%) | 6.20 | 2.20 | 0.41 | 1.25 | 24.4 | 1 | 3 | 3352 | 3925 |
| 6-14 | F5 (10%) | 6.19 | 2.36 | 0.44 | 1.22 | — | 1 | 3 | 3264 | 3756 |
| 6-15 | F5 (15%) | 6.39 | 2.23 | 0.43 | 1.27 | — | 1 | 3 | 3116 | 3811 |

Varying the mannitol type and amount revealed that higher levels of fondant reduces or eliminates the crunchiness of the candy, resulting in a chewy texture. Use of a puller process with high levels of fondant resulted in greater signs of ooze as the high level of fondant increases the moisture content of the candy product. Use of a sigma mixer or other higher energy mixer may allow for lower amounts of fondant to be used while still maintaining minimum ooze. With a pulling process, lower amounts of fondant (about 5%) can be used with a longer conditioning time to achieve good graining to minimize ooze yet allow the candy to remain chewy.

Finally, the fondants of Table 8 prepared using a Kajiwara oblique axis cooking mixer for high intensity mixing allowed for greater levels of mannitol to be used in the candy composition. The use of 57% mannitol resulted in the crystallization of the solution at cook temperatures. It was found that the addition of sorbitol syrup prevented the fondant from crystallizing out of solution.

As used herein the terms "comprising" (also "comprises," etc.), "having," and "including" is inclusive (open-ended) and does not exclude additional, unrecited elements or method steps. The singular forms "a," "an," and "the" include plural referents unless the context clearly dictates otherwise. The endpoints of all ranges directed to the same characteristic or component are independently combinable, and inclusive of the recited endpoint. The term "combination" is inclusive of a homogenous or non-homogenous blend, mixture, or alloy of the named components into an integrated whole. The term "homogenous" refers to a uniform blend of the components. The word "or" means "and/or."

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A multilayered confectionery, comprising:
a candy layer comprising a mixture comprising
a cooked base portion comprising mannitol and a hydrogenated starch hydrolysate syrup,
a fat, and
a fondant portion comprising mannitol, a hydrogenated starch hydrolysate syrup, and a sorbitol syrup, the fondant portion is present in an amount of about 10.0 to about 15.0% w/w of the candy layer,
wherein the candy layer comprises crystalline particles of mannitol, and
wherein the candy has a chewy texture; and
a first chewing gum layer comprising an elastomer and a second chewing gum layer comprising an elastomer;
wherein a first surface of the candy layer is in contiguous contact with a surface of the first chewing gum layer and a second surface of the candy layer is in contiguous contact with a surface of the second chewing gum layer to form a sandwich-like product with the candy layer in the middle and visible on four sides of the multilayered confectionery.

2. The multilayered confectionery of claim 1, wherein the water activity of the candy layer is within about 10% of the water activity of the chewing gum layer.

3. The multilayered confectionery of claim 1, wherein the confectionery comprises about 20 to about 40% w/w of the candy layer and about 60 to about 80% w/w of the combined weight of the first and second chewing gum layer based on the combined weight of candy layer and first and second chewing gum layer.

4. The multilayered confectionery of claim 1, wherein the hydrogenated starch hydrolysate syrup of the candy layer cooked base portion, the candy layer fondant portion, or both comprises maltitol and sorbitol in a ratio of about 1:0.8 to about 1:1.2 maltitol to sorbitol.

5. The multilayered confectionery of claim 1, wherein the hydrogenated starch hydrolysate syrup of the candy layer cooked base portion, the candy layer fondant portion, or both contains about 75 to about 85% solids, about 4% w/w sorbitol, about 53% w/w maltitol, about 22% w/w polyols having a degree of polymerization of 3-5, and about 21% w/w polyols having degree of polymerization of 6 and greater.

6. The multilayered confectionery of claim 1, wherein the total amount of mannitol and hydrogenated starch hydrolysate syrup present in the candy layer is about 70 to about 90% w/w of the candy layer.

7. The multilayered confectionery of claim 1, wherein the total amount of mannitol is about 6 to about 30% w/w of the candy layer.

8. The multilayered confectionery of claim 1, wherein the amount of mannitol from the base portion is about 8.0 to about 12.0% w/w of the candy layer, and the amount of hydrogenated starch hydrolysate syrup from the base portion is about 70.0 to about 74.0% w/w of the candy layer.

9. The multilayered confectionery of claim 1, wherein the mannitol is present in an amount of about 35 to about 60% w/w (dry) of the fondant, and hydrogenated starch hydrolysate syrup is present in an amount of about 40 to about 65% w/w (dry) of the fondant.

10. The multilayered confectionery of claim 1, wherein the mannitol is present in an amount of about 35 to about 60% w/w (dry) of the fondant, hydrogenated starch hydrolysate syrup is present in an amount of about 20 to about 33% w/w (dry) of the fondant; and sorbitol syrup is present in an amount of about 20 to about 33% w/w (dry) of the fondant.

11. The multilayered confectionery of claim 1, wherein the fondant is present in an amount of about 10.0 to about 12.0% w/w of the candy layer.

12. The multilayered confectionery of claim 1, wherein the candy layer has a moisture content of about 6.0 to about 8.0% w/w.

13. The multilayered confectionery of claim 1, wherein the candy layer further comprises a texturizing agent or an emulsifier.

14. The multilayered confectionery of claim 1, wherein the candy layer further comprises one or more ingredients selected from an additional sweetener, a sensate, a flavor, a color, a functional ingredient, a gas, an abrasive, particles of a second confectionery, a food acid or salt thereof, or a combination thereof.

15. The multilayered confectionery of claim 14, wherein the candy layer comprises a flavor in an amount of about 0.75 to about 3.0% w/w of the candy layer.

16. The multilayered confectionery of claim 14, wherein the sensate is a cooling agent, a warming agent, a tingling agent, or a combination thereof.

17. The multilayered confectionery of claim 14, wherein the candy layer comprises a food acid or salt thereof in an amount of about 0.5 to about 4.0% w/w of the candy layer.

18. The multilayered confectionery of claim 1, wherein the candy layer further comprises a mixture of flavor and a food acid in a ratio of about 1:1 flavor to food acid.

19. The multilayered confectionery of claim 1, wherein the fondant comprises crystalline particles of mannitol having an average particle size of less than 50 micrometers.

20. The multilayered confectionery of claim 1, wherein the fondant comprises crystalline particles of mannitol having crystals of an average length of ≤30 micrometers as determined by microscopic analysis.

21. The multilayered confectionery of claim 1,
wherein the amount of mannitol from the base portion is about 8.0 to about 12.0% w/w of the candy layer, and the amount of hydrogenated starch hydrolysate syrup from the base portion is about 70.0 to about 74.0% w/w of the candy layer;
wherein amount of mannitol from the fondant portion is about 4.0 to about 6.0% w/w of the candy layer; the amount of hydrogenated starch hydrolysate syrup from the fondant portion is about 1.0 to about 3.0% w/w of the candy layer; and sorbitol syrup in an amount of about 1.0 to about 3.0% w/w of the candy layer; and wherein the candy layer further comprises
a texturizing agent in an amount of about 1.0 to about 2.0% w/w of the candy layer;
a fat having a melting point of about 35 to about 40° C. in an amount of about 3.0 to about 4.0% w/w of the candy layer;
lecithin in an amount of about 0.001 to about 0.1% w/w of the candy layer;
glyceryl monostearate in an amount of about 0.01 to about 0.7% w/w of the candy layer; and
a moisture content of about 6.5 to about 7.0% w/w of the candy layer.

22. The multilayered confectionery of claim 1, wherein a sample piece of the candy layer measuring 35 mm long ×5.5 mm thickness ×12.5 mm width exhibits a maximum force of about 3000 to about 4000 grams when a texture analyzer probe penetrates the sample parallel to its thickness and perpendicular to the face measuring 35 mm long ×12.5 mm wide by 3 millimeters; wherein the sample is conditioned at 25° C. four hours prior to analysis, the texture analyzer plunger is 4 mm cylinder; the approach speed is 1 mm/sec; and the penetration distance is 4.3 mm.

23. The multilayered confectionery of claim 1, wherein the candy layer exhibits a water activity of about 0.38 to about 0.45.

24. The multilayered confectionery of claim 1, wherein the candy layer exhibits a density of about 1.1 to about 1.4 g/cm$^3$.

25. The multilayered confectionery of claim 1, wherein the first chewing gum layer comprises about 0.1 to about 0.5% w/w cooling agent by weight of the first chewing gum layer; and
the candy layer comprises about 1.0 to about 3.75% w/w food acid by weight of the candy layer.

26. The multilayered confectionery of claim 1, wherein the first chewing gum layer comprises about 1.5 to about 2.2% w/w flavor by weight of the first chewing gum layer; and
the candy layer comprises about 1.5 to about 3.0% w/w flavor by weight of the candy layer.

27. A method of making a multilayered confectionery, comprising:
preparing a candy layer comprising mixing a cooked base portion comprising mannitol and a hydrogenated starch hydrolysate syrup, a fat, and a fondant portion comprising mannitol, a hydrogenated starch hydrolysate syrup, and a sorbitol syrup to form a candy comprising crystalline particles of mannitol, wherein the candy has a chewy texture, the fondant portion is present in an amount of about 10.0 to about 15.0% w/w of the candy layer;
preparing a first chewing gum layer comprising an elastomer and a second chewing gum layer comprising an elastomer;
forming a multilayered confectionery wherein a first surface of the candy layer is in contiguous contact with a surface of the first chewing gum layer and a second surface of the candy layer is in contiguous contact with a surface of the second chewing gum layer to form a sandwich-like product with the candy layer in the middle and visible on four sides of the multilayered confectionery.

28. The method of claim 27, comprising:
cooking the base portion comprising mannitol and a hydrogenated starch hydrolysate syrup;
adding to the cooked base portion a texturizing agent, a fat, and optionally a food acid or salt thereof, a flavor, or a combination thereof to form a mixture;
cooling the mixture to form a cooled mixture;

adding the fondant portion to the cooled mixture to form a final mixture;

and pulling the final mixture to form a candy.

29. The method of claim 27, wherein the fondant comprises a moisture content of about 6.5 to about 11.0% w/w of the fondant.

30. The method of claim 27, wherein the temperature of the candy layer and chewing gum layer are at least 40° C. when formed into the multilayered confectionery.

31. The method of claim 27, wherein the fondant comprises crystalline particles of mannitol having an average particle size of less than 50 micrometers.

32. The method of claim 27, wherein the fondant comprises crystalline particles of mannitol having crystals of an average length of ≤30 micrometers as determined by microscopic analysis.

33. The multilayered confectionery of claim 1, wherein the texture of the candy layer is substantially the same as the texture of the first and second chewing gum layers.

\* \* \* \* \*